(12) United States Patent
Yamamoto

(10) Patent No.: US 7,586,649 B2
(45) Date of Patent: Sep. 8, 2009

(54) METHOD AND DEVICE FOR COMPRESSING IMAGE DATA

(75) Inventor: Toshitsugu Yamamoto, Takatsuki (JP)

(73) Assignee: Konica Minolta Business Technologies, Inc., Tokyo (JP)

( * ) Notice: Subject to any disclaimer, the term of this patent is extended or adjusted under 35 U.S.C. 154(b) by 279 days.

(21) Appl. No.: 11/318,046

(22) Filed: Dec. 23, 2005

(65) Prior Publication Data
US 2006/0139696 A1 Jun. 29, 2006

(30) Foreign Application Priority Data
Dec. 27, 2004 (JP) ............................. 2004-377575

(51) Int. Cl.
*G06K 15/00* (2006.01)
*H04N 1/405* (2006.01)
*G09G 5/02* (2006.01)

(52) U.S. Cl. .................... 358/3.13; 358/3.14; 358/3.16; 345/596

(58) Field of Classification Search ................ 358/3.13, 358/3.14, 3.16, 3.17, 3.18; 345/596
See application file for complete search history.

(56) References Cited

U.S. PATENT DOCUMENTS

| 6,201,614 | B1 | 3/2001 | Lin | |
|---|---|---|---|---|
| 6,980,254 | B1 * | 12/2005 | Nishihashi et al. | 348/452 |
| 2005/0063015 | A1 * | 3/2005 | Kakutani | 358/3.12 |
| 2005/0123206 | A1 * | 6/2005 | Sakai et al. | 382/238 |

FOREIGN PATENT DOCUMENTS

JP 6-152986 5/1994

* cited by examiner

*Primary Examiner*—Mark K Zimmerman
*Assistant Examiner*—Fan Zhang
(74) *Attorney, Agent, or Firm*—Sidley Austin LLP

(57) ABSTRACT

A method for compressing image data that are processed by a pseudo gradation process using a dither pattern is provided. The method includes the steps of dividing the image data into predetermined areas, determining whether or not a dot arrangement pattern of the image data in each area matches the dither pattern that was used in the pseudo gradation process, determining a representative value concerning density of the image data in the area if the dot arrangement pattern matches the dither pattern, and making compressed data by using the determined representative value.

29 Claims, 28 Drawing Sheets

TJK

MINIMUM VALUE OF UPPER LIMIT VALUE

MAXIMUM VALUE OF LOWER LIMIT VALUE

| POSITION | DOT PATTERN | | |
|---|---|---|---|
| (0, 0) | 0 | 255 | 175 |
| (0, 0) | 1 | 1 | 175 |
| (0, 0) | 2 | 1 | 175 |
| ⋮ | ⋮ | ⋮ | ⋮ |
| (0, 0) | 254 | 1 | 2 |
| (0, 0) | 255 | 1 | 0 |
| (0, 1) | 0 | 255 | 155 |
| ⋮ | ⋮ | ⋮ | ⋮ |
| (0, 1) | 255 | 1 | 0 |
| (0, 2) | 0 | 255 | 141 |
| ⋮ | ⋮ | ⋮ | ⋮ |
| (34, 17) | 255 | 0 | 0 |

| INPUT | OUTPUT CODE | OUTPUT DIGIT NUMBER |
|---|---|---|
| 0 | 0 | 1 |
| 1 | 10101 | 5 |
| 2 | 110010 | 6 |
| 3 | 1000100 | 7 |
| 4 | 1011011 | 7 |
| 5 | 10000111 | 8 |
| ⋮ | ⋮ | ⋮ |
| 252 | 1010000 | 7 |
| 253 | 101111 | 6 |
| 254 | 100011 | 6 |
| 255 | 10010 | 5 |
| 256 | 11 | 2 |
| 257 | 10011 | 5 |
| 258 | 10100101 | 8 |

(b)
FH2

| INPUT | OUTPUT CODE | OUTPUT DIGIT NUMBER |
|---|---|---|
| 0 | 0 | 1 |
| 1 | 1010 | 4 |
| 2 | . | . |
| ⋮ | ⋮ | ⋮ |
| 23 | | |
| 24 | | |
| 25 | | |

(c)
FH3

| INPUT | OUTPUT CODE | OUTPUT DIGIT NUMBER |
|---|---|---|
| 0 | 0 | 1 |
| 1 | 1010 | 4 |
| 2 | . | . |
| ⋮ | ⋮ | ⋮ |
| 254 | | |
| 255 | | |

FIG. 17

THE NUMBER OF MARKS = 26

Root = 24

DC2

| Root | CHILD 0 | CHILD 1 |
|---|---|---|
| 0 | -12 | -16 |
| 1 | -10 | -15 |
| 2 | -21 | -11 |
| 3 | -17 | -6 |
| 4 | -4 | -23 |
| 5 | -18 | -22 |
| 6 | 0 | -24 |
| 7 | -3 | -20 |
| 8 | -14 | -9 |
| 9 | 1 | -5 |
| 10 | -19 | -8 |
| 11 | 3 | 2 |
| 12 | -7 | -13 |
| 13 | 5 | 4 |
| 14 | -25 | 6 |
| 15 | 8 | 7 |
| 16 | 10 | 9 |
| 17 | 11 | -2 |
| 18 | 13 | 12 |
| 19 | 15 | 14 |
| 20 | 17 | 16 |
| 21 | 19 | 18 |
| 22 | 21 | 20 |
| 23 | -1 | 22 |
| 24 | 23 | -26 |

「011011」
① STARTING FROM ROOT=24
② ③ ④ ⑤

METHOD AND DEVICE FOR COMPRESSING IMAGE DATA

This application is based on Japanese Patent Application No. 2004-377575 filed on Dec. 27, 2004, the contents of which are hereby incorporated by reference.

BACKGROUND OF THE INVENTION

1. Field of the Invention

The present invention relates to a method for compressing image data with pseudo gradation using dither pattern, a method for expanding the image data, and a compressing device.

2. Description of the Prior Art

A print system including a computer, a printer and the like is used commonly. Concerning this print system, there is a method of performing image processing such as a pseudo gradation process of image data to be printed at the computer side and printing the image on paper at the printer without performing any specific process on the image data transmitted from the computer.

Conventionally, a raster printer is known as the printer that is used for this method. The raster printer does not perform any special image processing at the printer side, so it can be realized at low cost using a small scale of hardware. However, it transmits image data that can be printed on paper without any conversion to the printer, so it has a drawback that quantity of data to be transmitted is apt to be large. In addition, if the image data contains character data, resolution should be increased for printing characters clearly. As a result, quantity of data to be transmitted to the printer is further increased. Accordingly, it takes much time to transmit image data from the computer to the printer.

In order to solve this problem, image data should be compressed at the computer side. However, if the compression process is complicated, the compression process itself may require much time. Moreover, expansion process at the printer side also takes much time, and hardware for the process becomes large and expensive.

Therefore, in order to enable to use an inexpensive printer and realize a print system that is capable of processing at high speed as a whole, a novel compression technique is desired that can perform compression with a small process load, perform expansion with a small scale of hardware and realize a high compressibility.

Furthermore, in order to print multi-gradation image data by a printer, the image data should be processed with a pseudo gradation process in many cases. As a method of the pseudo gradation process, a dithering method is known conventionally. The dithering method utilizes a dither pattern and compares each threshold value of the dither pattern with each pixel value of the image data to generate binary data.

As a compression technique using a dither pattern, there is a method disclosed in Japanese unexamined patent publication No. 6-152986. According to the method shown in this document, the binary image data are divided into blocks by a predetermined size. A reference pattern corresponding to the number of dots contained in a certain image block is compared with the image block. If the image block matches the reference pattern, a code indicating the reference pattern is assigned. Otherwise, a result of the comparison is encoded.

In addition, as a compression technique for binary image data, there is known a JBIG format that is approved to be adopted by ITU (International telecommunications union)-T recommendation.

In addition, a method for compressing image data processed with pseudo gradation process using a dither pattern is disclosed in U.S. Pat. No. 6,201,614. According to the method described in this document, a pixel value of each pixel is compared with a threshold value so that a range is determined for each pixel.

However, the above-mentioned method of the first document has a drawback. Since the reference pattern is encoded if a designated image block matches the reference pattern, quantity of data to be transmitted is increased by quantity of the code of the reference pattern.

In contrast, the JBIG format requires a relatively light load and can perform the compression process fast even on a computer. However, the JBIG format has lower compressibility than other format such as LZS format or LZW format. In particular, its compressibility decreases if half tone data increases.

Furthermore, the above-mentioned method of the second document determines a value of each pixel, so quantity of information is not decreased by it only. Therefore, another compression means are necessary for decreasing quantity of information.

SUMMARY OF THE INVENTION

An object of the present invention is to provide a compression method, an expansion method and a compression device that can compress image data processed with pseudo gradation process by using a dither pattern, at high speed with high compressibility, and can reconstruct the same at high speed with small-scale hardware.

The compressing method of the present invention is a method for compressing image data that are processed by a pseudo gradation process using a dither pattern. The method includes the steps of dividing the image data into predetermined areas, determining whether or not a dot arrangement pattern of the image data in each area matches the dither pattern that was used in the pseudo gradation process, determining a representative value concerning density of the image data in the area if the dot arrangement pattern matches the dither pattern, and making compressed data by using the determined representative value.

When the image data is divided into predetermined areas, it is divided into areas including 10-100 pixels, for example. In this case, the process is performed efficiently if the number of pixels in the area is multiples of 8 like 24 pixels, 48 pixels or 96 pixels.

The determination whether or not the dot arrangement pattern (dot pattern) matches the dither pattern is performed as follows, for example. It is supposed there are uniform image data in which all pixels have one density value (or gradation value). If the whole or a part of the dot pattern obtained by binarization process of an imaginary image data with the dither pattern matches a dot pattern of one of the divided areas, it is determined that the dot pattern of the area matches the dither pattern. In other words, when a dot pattern is generated by using a dither pattern for a density value, if a density value exists so that the generated dot pattern and the dot pattern of the area match each other, it is said that they match each other. Such a density value may be one specific value or plural values within a certain range. This density value is the representative value.

Therefore, the resolution means described above can be translated as follows. The image data is divided into predetermined areas, and it is determined whether or not a dot arrangement pattern of the image data in each area corresponds to at least a part of the dither pattern that was used in the pseudo gradation process. If it corresponds, a representative value concerning density of the image data in the area is determined. Then, the determined representative value is used for making the compressed data.

Preferably, supposing dots are made in a pattern area that was prepared in advance when the density value of each pixel of the image data in the area is compared with the density value of each pixel of a corresponding part of the dither pattern and the density value of each pixel of the image data is smaller than the other, a value "a" is used as the representative value, the value "a" satisfying the condition $$J \geq a \geq K$$

between a minimum value J of density values of pixels of the dither pattern corresponding to dots that were made in the area and a maximum value K of density values of pixels of the dither pattern corresponding to dots that were not made in the area.

Here, a density value of the dither pattern is usually provided by a threshold value of the dither pattern. Therefore, "a density value of each pixel of a corresponding part of the dither pattern" can be translated into "a threshold value of each pixel of a corresponding part of the dither pattern."

Furthermore, when dots are made if the density value of each pixel of the image data is larger than the other, the representative value "a" may be determined so that the condition is satisfied between a minimum value J of a density value of a pixel of the dither pattern corresponding to a dot that was not made in the area and a maximum value K of a density value of a pixel of the dither pattern corresponding to a dot that was made in the area. In this way, according to the present invention, relationship among gradation property, density and whether dot is made or not can be applied by various combinations.

In addition, supposing dots are made in a pattern area that was prepared in advance when the density value of each pixel of the image data in the area is compared with the density value of each pixel of a corresponding part of the dither pattern and the density value of each pixel of the image data is smaller than the other, the number of dots that were made or dots that were not made in the area is used as the representative value.

In addition, a value having a minimum differential of the representative value between neighboring areas is used as the representative value.

In addition, a differential of the representative value between each area and another area is determined, and the determined differential is encoded when the compressed data are made.

In addition, if there are plural dither patterns that were used for the pseudo gradation process, the plural dither patterns are switched, and it is determined whether or not one of them matches the dot arrangement pattern of the image data in the area.

In addition, if the dot arrangement pattern of the image data in the area does not match the dither pattern that was used in the pseudo gradation process, the area is further divided into plural small areas, and it is determined whether or not a dot arrangement pattern of the image data in each small area matches the dither pattern.

In addition, a value "a" is used as the representative value, the value "a" satisfying the condition $$J \geq a \geq K$$

between the minimum value J and the maximum value K, and the number of dots that were made or dots that were not made in the area is used as the representative value in the small area. In this case, the representative value "a" determined by the same method as the case of the area may be used as the representative value in the small area.

In addition, if the dot arrangement pattern of the image data in the area or the small area does not match the dither pattern that was used in the pseudo gradation process, an arrangement of dots that were made or dots that were not made in the area or the small area is encoded so as to make the compressed data.

In addition, according to another embodiment of the present invention, the method includes a first step for dividing the image data into predetermined areas, a second step for determining whether or not a dot arrangement pattern of the image data in each area matches the dither pattern that was used in the pseudo gradation process, a third step that is performed if the patterns match each other in the second step, for determining a representative value concerning density of the image data in the area supposing dots are made in the pattern area that was prepared in advance when the density value of each pixel of the image data in the area is compared with the density value of each pixel of a corresponding part of the dither pattern and the density value of each pixel of the image data is smaller than the other, the representative value being a value "a" that satisfies the condition $$J \geq a \geq K$$

between a minimum value J of density values of pixels of the dither pattern corresponding to dots that were made in a pattern area and a maximum value K of density values of pixels of the dither pattern corresponding to dots that were not made in the pattern area, a fourth step that is performed if the patterns do not match each other in the second step, for dividing the area further into plural small areas and for determining whether or not a dot arrangement pattern of the image data in each small area matches the dither pattern, a fifth step that is performed if the patterns match each other in the fourth step, for determining the number of dots that were made or dots that were not made in the area as the representative value in the small area, a sixth step that is performed if the patterns do not match each other in the fourth step, for encoding the dot arrangement in the small area, and a seventh step that is performed if the patterns match each other in the second step or the fourth step, for encoding in accordance with the determined representative value.

An expansion method according to the present invention includes the steps of obtaining a representative value of each area from the compressed image data, and comparing the obtained representative value with the dither pattern for reconstructing the dot pattern.

A compressing device according to the present invention is a device for compressing image data that are processed by a pseudo gradation process using a dither pattern. The device includes a portion for dividing the image data into predetermined areas, a portion for determining whether or not a dot arrangement pattern of the image data in each area matches the dither pattern that was used in the pseudo gradation process, a portion for determining a representative value concerning density of the image data in the area if the dot arrangement pattern matches the dither pattern, and a portion for generating compressed data by using the determined representative value.

In the present invention, the image data that are processed by a pseudo gradation process may be binary image data or multi-valued image data having four values, eight values, sixteen values or the like.

According to the present invention, image data that are processed by a pseudo gradation process using a dither pattern can be compressed at high speed and with high compressibility. In addition, they can be reconstructed fast by small-scaled hardware. Thus, the entire process can be performed in a short time by using an inexpensive printer.

BRIEF DESCRIPTION OF THE DRAWINGS

FIGS. 16(a)-16(c) are diagrams showing examples of a Huffman code table.

FIG. 17 is a diagram showing an example of a decode table.

DESCRIPTION OF THE PREFERRED EMBODIMENTS

Hereinafter, the present invention will be explained more in detail with reference to embodiments and drawings.

In the following description of embodiments, a case where image data of two values with pseudo gradation are compressed will be explained as a first embodiment, and a case where image data of four values with pseudo gradation are compressed will be explained as a second embodiment. The second embodiment will be described only about important points that are different from the first embodiment.

First Embodiment

Case where Image Data of Two Values are Compressed

[General Structure of System]

Figure 1:
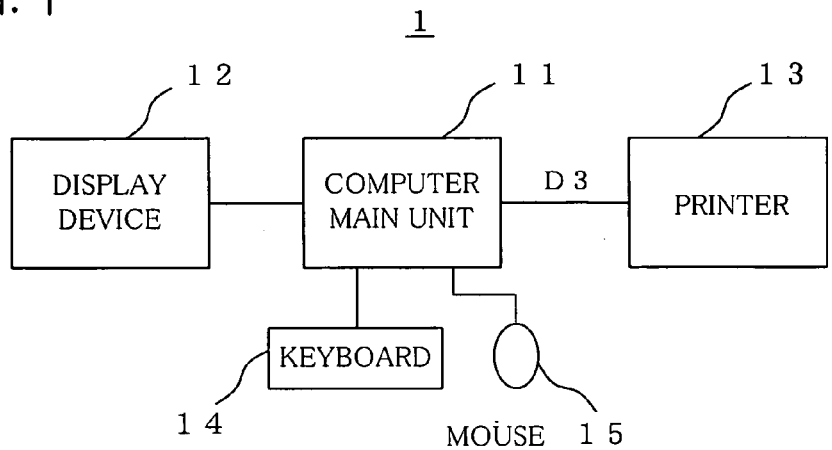
FIG. 1 is a diagram showing a general structure of a print system according to the present invention.

FIG. 1 is a diagram showing a general structure of a print system 1 to which a method for compressing image data according to the present invention is applied.

As shown in FIG. 1, the print system 1 is made up of a computer main unit 11, a display device 12, a printer 13, a keyboard 14, a mouse 15 and the like.

The computer main unit 11 performs a pseudo gradation process of image data entered externally or image data generated internally (original image data) by a dithering method using a dither pattern. The pseudo gradation process is also called a halftone process. In this embodiment, a binarization process is performed as the pseudo gradation process so that binary image data D1 are generated. Then, the generated binary image data D1 are compressed so that compressed data D2 are generated. The generated compressed data D2 are transmitted to the printer 13. The printer 13 receives the compressed data D2, refers to a dither pattern or the like that was used in the binarization process concerning the data, and reconstructs binary image data (a halftone image), which are printed on paper or the like.

In this embodiment, a dither pattern information component and an image information component are separated from the binary image data D1 in the compression process. Then only the image information component is extracted, and an encoding process of the Huffman method is performed so that compressed data D2 are generated. The dither pattern information component is not included in the compressed data D2. In the conventional method, both the dither pattern information component and the image information component are integrated for the compression process.

More specifically, in the compression process of this embodiment, the binary image data D1 are divided into plural areas (low resolution areas TL that will be described later). It is determined whether or not a dot arrangement pattern of the image data in each area matches the dither pattern that was used in the binarization process. If they match each other, a representative value "a" about density of the image data in the area is determined. Then differential information of the representative value "a" between neighboring areas is calculated, and the calculated differential information is encoded by the Huffman method so that the compressed data D2 are obtained. The dither pattern that was used in the binarization process is the dither pattern information component, while the representative value "a" is the image information component.

A plurality of dither patterns is switched and used corresponding to a type of an area such as a character area or an image area in the binarization process. Therefore, also in the compression process, the plural dither patterns are switched for determining whether or not each of them matches a dot arrangement pattern of the image data in each area.

If it does not match any of the dither patterns, the area is further divided into plural small areas (medium resolution areas TM that will be described later), and it is determined whether or not a dot arrangement pattern of the image data in each of the small areas matches the dither pattern. If they match each other, the number of dots in the small area is made the representative value. If they still don't match each other, dot arrangement in the area or the small area is encoded so that the compressed data D2 are obtained.

The computer main unit 11 transmits the obtained compressed data D2 to the printer 13. The computer main unit 11 also transmits to the printer 13 in advance information about the dither pattern and a decode table DC that is a table for reconstruction by the Huffman method. As the decode table DC, there are decode tables DC1-DC3 corresponding to a low resolution area, a medium resolution area and a high resolution area, respectively. They will be described in detail later.

The printer 13 obtains a representative value "a" of each area from the compressed data D2 transmitted from the computer main unit 11, compares the obtained representative value "a" with a corresponding dither pattern, and reconstructs a dot pattern (a dot arrangement pattern) that is the same as the original binary image data D1. In this reconstruction process, the decode table DC is used for reconstruction by the Huffman method.

As the computer main unit 11, a personal computer, a workstation or other various types of computer can be used. As the printer 13, a raster printer, a GDI printer or other various types of printer can be used.

[Compression Process]

Next, the compression process in the computer main unit 11 will be described more in detail.

Figure 2:
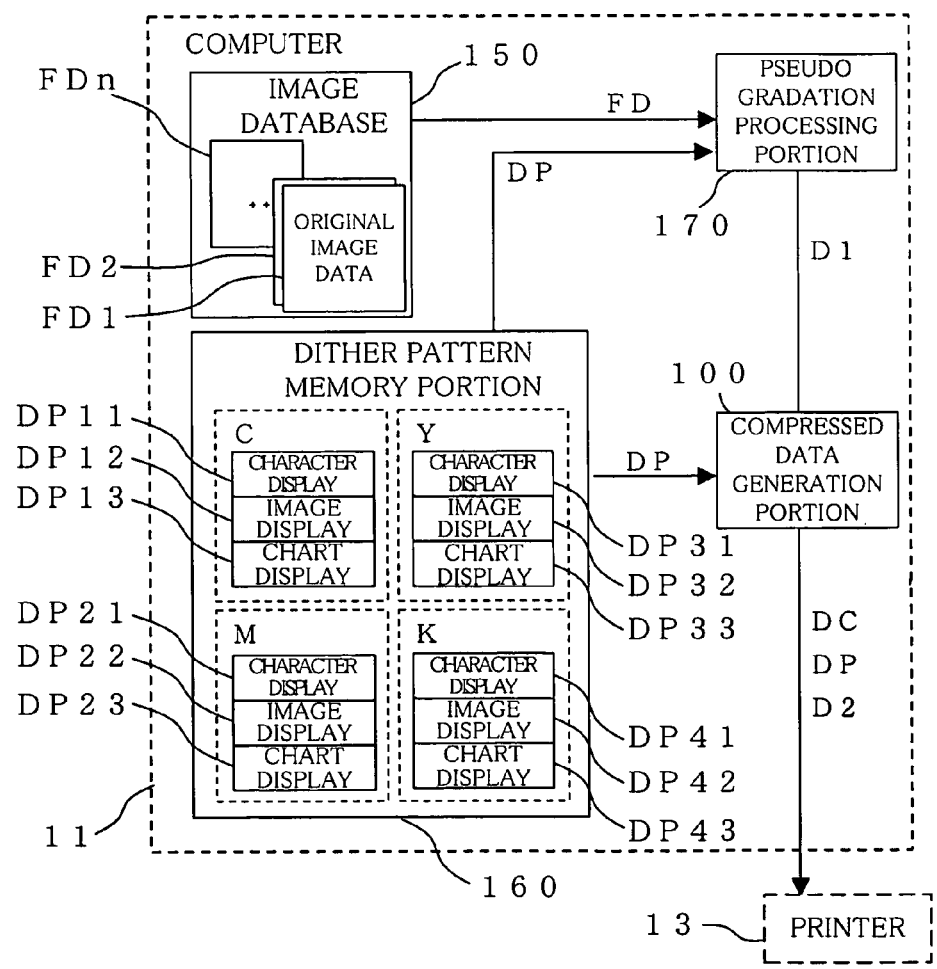
FIG. 2 is a block diagram showing a functional structure of a computer main unit.
Figure 3:
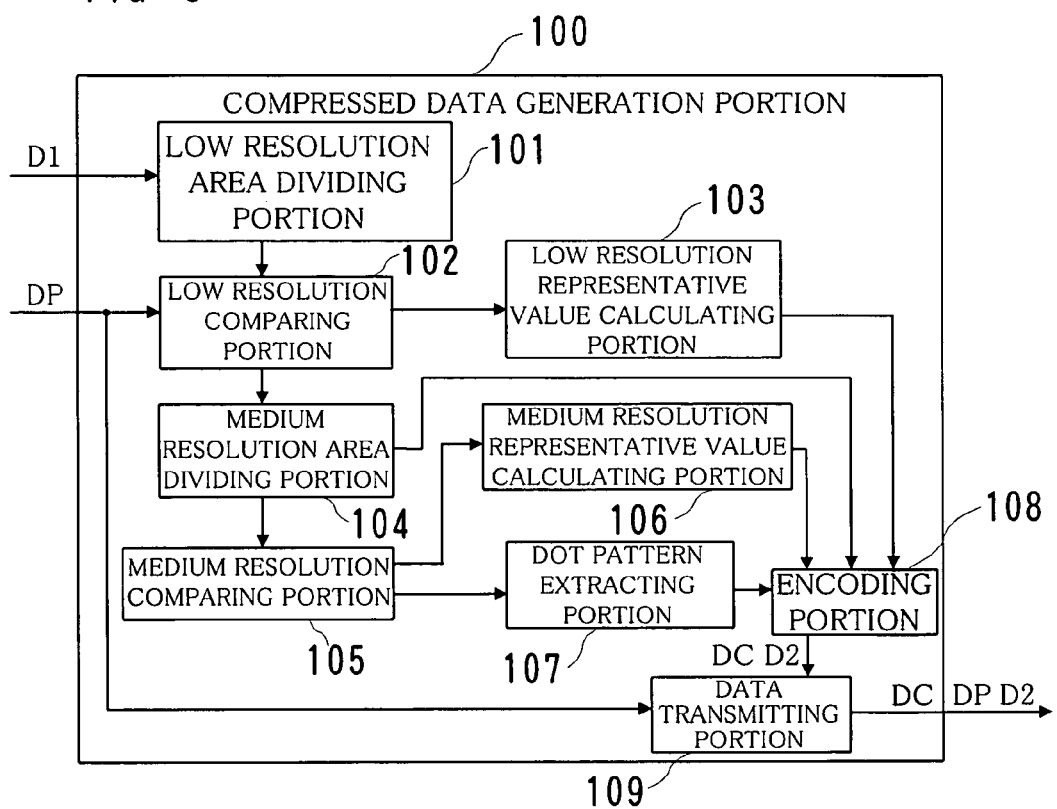
FIG. 3 is a block diagram showing functionally a compressed data generation portion of the computer main unit.
Figure 4:
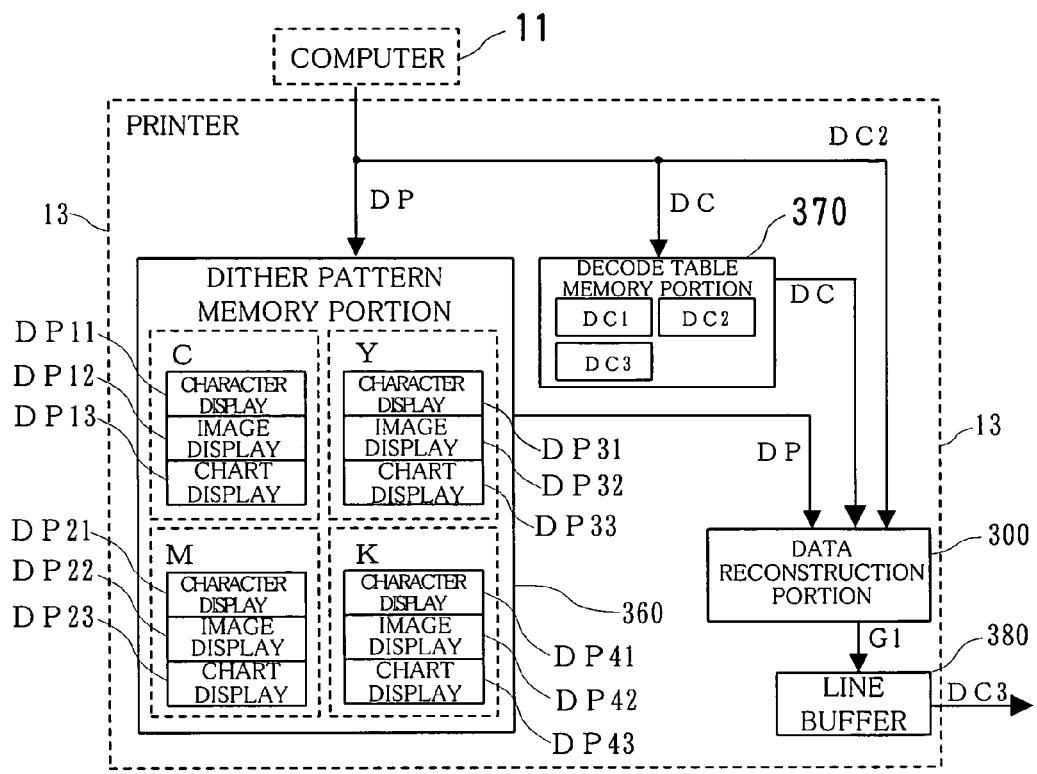
FIG. 4 is a block diagram showing a functional structure of a printer.
Figure 5:
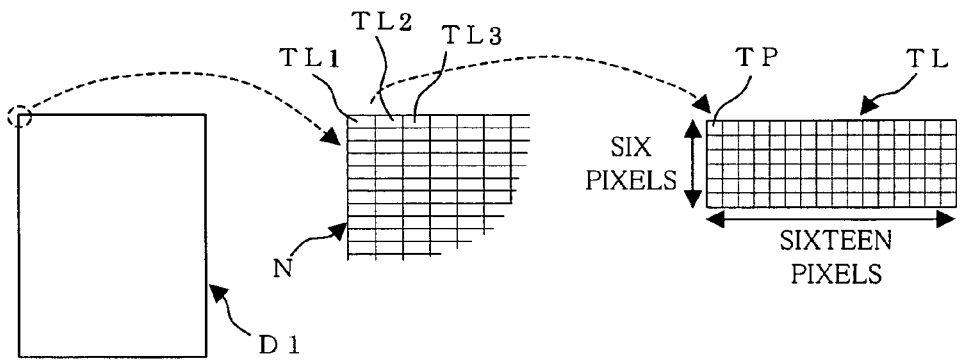
FIG. 5 is a diagram showing a divided low resolution area.
Figure 6:
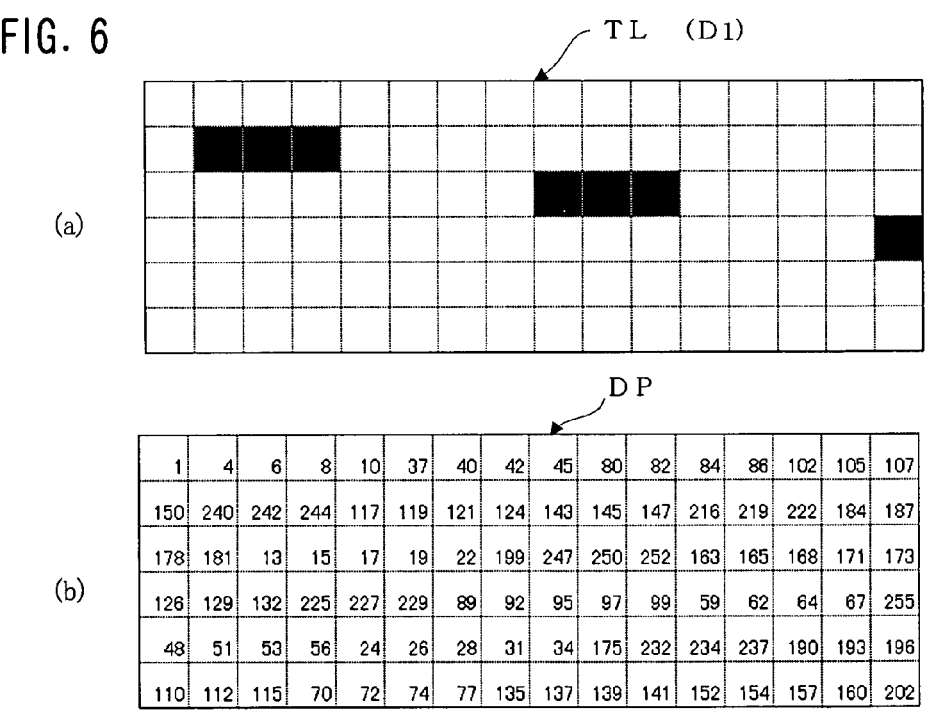
FIGS. 6(a) and 6(b) are diagrams showing examples of the low resolution area and a dither pattern.
Figures 7, 8:
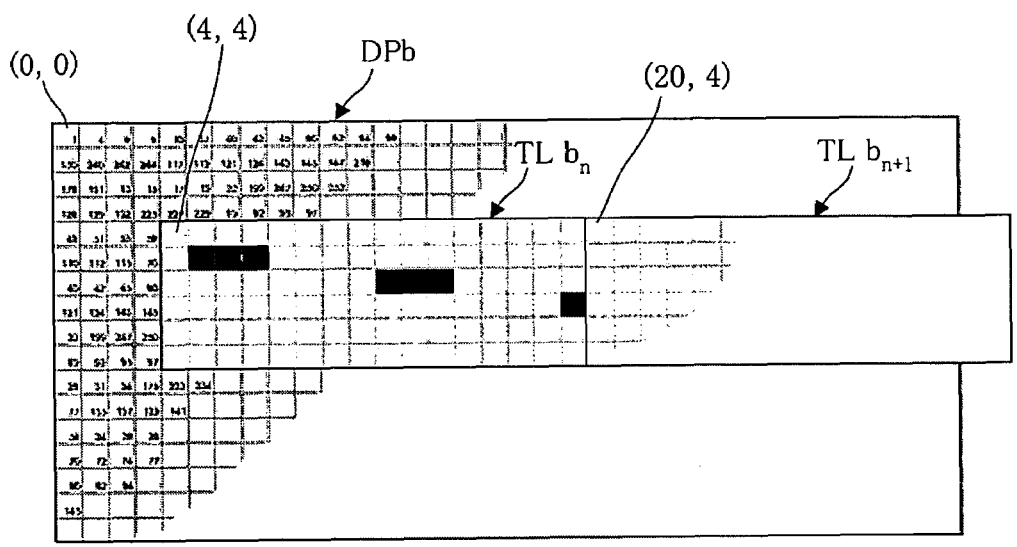
FIG. 7 is a diagram showing an example of the low resolution area and the dither pattern having different sizes.
FIG. 8 is a diagram showing an example of an upper and lower limit table.

FIG. 2 is a block diagram showing a functional structure of the computer main unit 11, FIG. 3 is a block diagram showing functionally a compressed data generation portion 100 of the computer main unit 11, FIG. 4 is a block diagram showing a functional structure of the printer 13, FIG. 5 is a diagram showing a divided low resolution area TL, FIGS. 6(a) and 6(b) are diagrams showing examples of the low resolution area TL and a dither pattern DP, and FIG. 7 is a diagram showing an example of the low resolution area TL and the dither pattern DP having different sizes.

As shown in FIG. 2, the computer main unit 11 is made up of an image database 150, a dither pattern memory portion 160, a pseudo gradation processing portion 170 and a compressed data generation portion 100.

The image database 150 includes many image data (original image data) FD1, FD2, . . . FDn with gradation property. The whole or a part of the image data FD1-FDn may be referred to as "image data FD". Note that most of the image data FD are color image data, and in this case one piece of image data FD is made up of image data of C (cyan), M (magenta), Y (yellow) and K (black) colors. The image data FD are obtained by entering them from a scanner, a digital camera or other external devices, or by editing internally, for example.

The dither pattern memory portion 160 stores plural types of dither patterns DP11-DP13, DP21-DP23, DP31-DP33 and DP41-DP43. The whole or a part of these patterns may be referred to as a "dither pattern DP".

The dither pattern DP is provided with character area dither patterns DP11, DP21, DP31 and DP41, image area dither patterns DP12, DP22, DP32 and DP42, and chart area dither patterns DP13, DP23, DP33 and DP43 for each of C, M, Y and K colors.

The pseudo gradation processing portion 170 performs the binarization process on the image data FD stored in the image database 150 using a dither pattern DP selected from the dither pattern memory portion 160 and transmits the obtained binary image data D1 to the compressed data generation portion 100. The binary image data D1 are also made up of binary image data of C, M, Y and K colors.

The compressed data generation portion 100 generates the compressed data D2 by compressing the binary image data D1, delivers the generated compressed data D2, the dither pattern DP and the decode table DC and transmits them to the printer 13.

As shown in FIG. 3, the compressed data generation portion 100 is made up of a low resolution area dividing portion 101, a low resolution comparing portion 102, a low resolution representative value calculating portion 103, a medium resolution area dividing portion 104, a medium resolution comparing portion 105, a medium resolution representative value calculating portion 106, a dot pattern extracting portion 107, an encoding portion 108, a data transmitting portion 109 and the like.

[Process of Low Resolution Area]

The low resolution area dividing portion 101 divides the binary image data D1 transmitted from the pseudo gradation processing portion 170 into low resolution areas TL that are many small areas. The low resolution area TL is a rectangular area containing 96 (6×16) pixels TP as shown in FIG. 5, for example. In the example shown in FIG. 5, the whole area of the binary image data D1 is divided into low resolution areas TL1, TL2, TL3, . . . TLn sequentially from the upper left corner.

The low resolution comparing portion 102 compares a dot pattern of each low resolution area TL with the dither pattern DP and determines whether or not they match each other. The determination is performed as follows.

Imaginary uniform image data is supposed, in which every pixel has the same density value (or gradation value). If a dot pattern that is obtained by the binarization process of the imaginary image data using the dither pattern DP is equal to the dot pattern of the low resolution area TL, it is determined that the dot pattern of the low resolution area TL matches the dither pattern DP. The density value that is used for the determination can be any value. In other words, it is determined that they match each other if there is a density value that makes the dot patterns equal to each other when the dot pattern is generated by using the dither pattern DP. Therefore, the density value can be one specific value or can be plural values in a certain range. This density value is the representative value "a" described above. The relationship will be described again later.

The low resolution comparing portion 102 performs the comparison between the dot pattern of the low resolution area TL and the dither pattern DP sequentially from the upper left corner for each area of the binary image data D1. For example, it is performed from the left end toward the right end concerning plural unit lines located at the upper side. When one unit line is finished, the process goes to the left end of the lower neighboring unit line 1, and the process is performed sequentially again toward the right end for each area to finish at the lower right end area.

As the dither pattern DP that is used for the comparison, a dither pattern DP corresponding to each color of the binary image data D1 is used. Then corresponding to each color, the character area dither pattern DP is used first. If the character area dither pattern DP does not match, the image area dither pattern DP is used next. If this also does not match, the chart area dither pattern DP is used. In this way, the dither patterns DP are switched sequentially if one of them does not match. Information indicating that the dither pattern DP was switched is used for encoding as information for specifying the dither pattern DP that was used. If neither dither pattern DP matches, a determination result of "not match" is output.

The low resolution representative value calculating portion 103 determines the representative value "a" when the comparison result by the low resolution comparing portion 102 matches. The representative value "a" is determined as follows.

[How to Determine Representative Value "a"]

In the low resolution area TL shown in FIG. 6(*a*), black pixels are dotted pixels. Here, among image data FD with gradation property before the binarization process, image data FD in the area corresponding to the low resolution area TL are considered. Such image data FD are referred to as "image data FDL" here. If a density value of each pixel of the image data FDL is less than the threshold value of the pixel corresponding to the dither pattern DP shown in FIG. 6(*b*), it is regarded that the pixel is dotted. In other words, it is regarded here that smaller density value corresponds to higher density.

In this case, if a certain pixel is dotted, it can be said that a density value of the pixel is less than a threshold value of the corresponding pixel of the dither pattern DP. This can be translated into that the upper limit value of the density of the pixel is smaller than the threshold value of the corresponding pixel of the dither pattern DP by "1". On the contrary, if the pixel is not dotted, it can be said that a density value of the pixel is more than or equal to the threshold value of the corresponding pixel of the dither pattern DP. This can be translated into that the lower limit value of the density of the pixel is the threshold value of the corresponding pixel of the dither pattern DP.

Therefore, in the low resolution area TL and the dither pattern DP, an upper limit value and a lower limit value of each pixel are summed up, so that a minimum value J of the upper limit value and a maximum value K of the lower limit value are determined. If the following relationship (1) is satisfied concerning the minimum value J of the upper limit value and the maximum value K of the lower limit value, a value "a" that satisfies the relationship (2) exists.

$$J \geq K \quad (1)$$

$$J \geq a \geq K \quad (2)$$

This value "a" is the representative value "a". In other words, if the above relationship (1) is satisfied, a dot pattern of the low resolution area TL matches the dither pattern DP and the representative value "a" exists. When the representative value "a" is determined, it is possible to reconstruct the dot pattern in the low resolution area TL from the dither pattern DP. In other words, only if the one representative value "a" in each area is determined as the image information component, the binary image data D1 in the area can be reconstructed by using the dither pattern DP that matches the low resolution area TL.

Therefore, if this representative value "a" is transmitted to the printer 13, the dot pattern of the binary image data D1 can be reconstructed in the printer 13 by using an appropriate dither pattern DP that is the same as that when the binary image data D1 was obtained.

Figure 24:
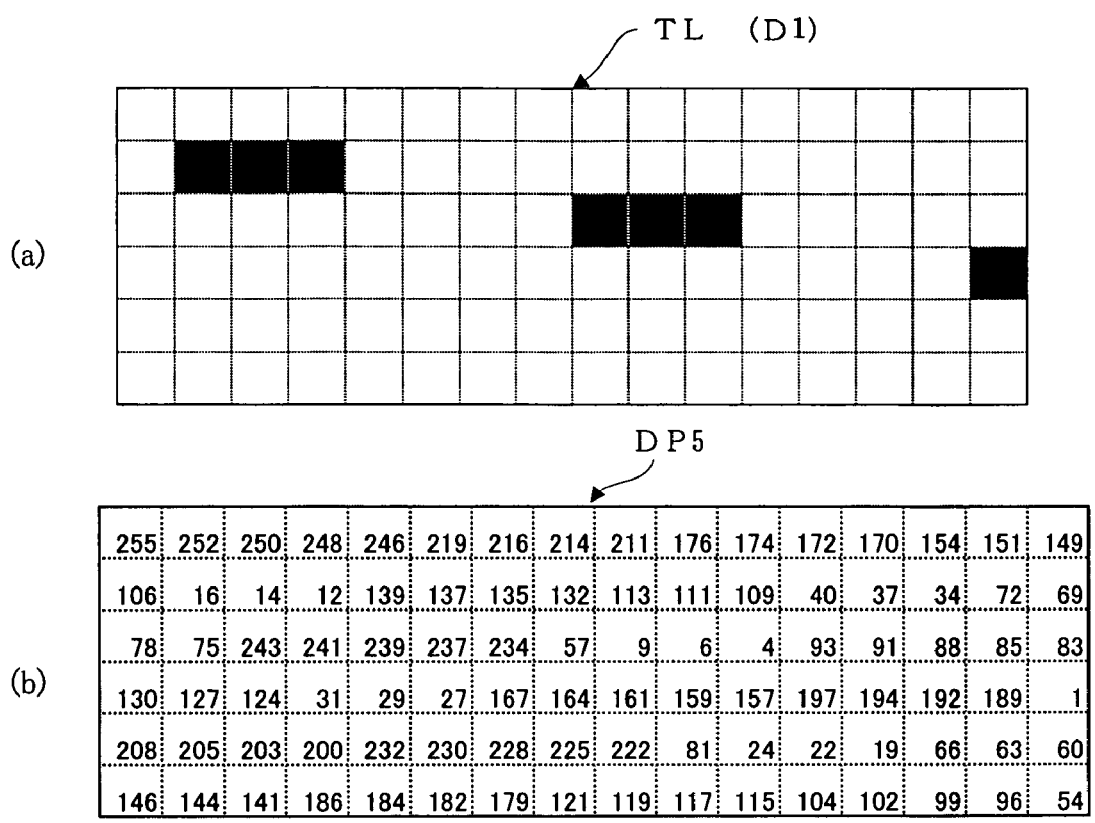
FIGS. 24(a) and 24(b) are diagrams showing a divided low resolution area.

Although it is considered that the pixel is dotted if a density value of each pixel of the image data FDL is less than a threshold value of the dither pattern DP in the example shown in FIG. 6, it is possible to consider on the contrary that the pixel is dotted if the density value of each pixel of the image data FDL is more than or equal to the threshold value of the dither pattern DP5 as shown in FIG. 24. In other words, it is possible to consider that larger density value corresponds to higher density. In this case, if a certain pixel is dotted, it can be said that a density value of the pixel is larger than or equal to a threshold value of the corresponding pixel of the dither pattern DP5. In other words, it can be said that the lower limit value of the density of the pixel is the threshold value of the corresponding pixel of the dither pattern DP5. If the pixel is not dotted, it can be said that a density value of the pixel is less than the threshold value of the corresponding pixel of the dither pattern DP5. In other words, it can be said that a density value of the pixel is smaller than the threshold value of the corresponding pixel of the dither pattern DP5 by "1". In this case, the value "a" that satisfies the relationship (2) is regarded as the representative value in the same manner as described above.

Supposing that the image data FD has 256 gradation steps for each color, the representative value "a" has information quantity of eight bits. In this embodiment, the low resolution area TL has information quantity of 6×16=96 bits, which can be expressed by eight bits. Therefore, the information quantity can be compressed to approximately one tenth. In addition, representative values "a" of neighboring low resolution areas TL are close to each other concerning most image data FD. In other words, differential of density between neighboring areas is small. Therefore, a difference between the representative values "a" is small. Accordingly, when a difference is determined between the representative value "a" in a certain low resolution area TL and the representative value "a" in the low resolution area TL that was determined just before that, the difference becomes "0" in many cases so that deviation of statistical frequency of the difference increases. In other words, if a differential of the representative value "a" is used instead of the representative value "a" itself, it becomes possible to compress with higher compressibility using the Huffman encoding method. Thus, the data can be further compressed to a fraction in the encoding process.

Although the size of the low resolution area TL becomes the same as the size of the dither pattern DP after the division in the example described above with reference to FIG. 6, these sizes may be different from each other.

For example, as shown in FIG. 7, the size of the low resolution area TLb can be smaller than the size of the dither pattern DPb. In this case, plural low resolution areas TLbn and TLbn+1 are compared with different parts in the dither pattern DPb, respectively. In this case, a coordinate position of the dither pattern DPb that is used for the first low resolution area TLb of the binary image data D1 is determined, and then the dither pattern DPb is shifted sequentially so that a coordinate position of the dither pattern DPb that is used for each of all low resolution areas TLb can be determined uniquely.

On the contrary to the example shown in FIG. 7, the size of the low resolution area TL may be larger than the size of the dither pattern DP.

The representative value "a" described above can be determined by various methods as understood clearly from the above description. As one of the examples, a method for determining the representative value "a" by referring to a table that was generated in advance will be described next.

As described above, what is necessary for determining the representative value "a" is the minimum value J of the upper limit value and the maximum value K of the lower limit value of each pixel value corresponding to a dot pattern in a certain area. These values depend on a position in the dither pattern DP and a dot pattern in the area when the dither pattern DP is given. The position in the dither pattern DP can be expressed by two variables as coordinates of the first pixel in the area. The dot pattern can be expressed by an integer value of 0-255 per block when one block of eight pixels is digitized (see FIG. 14). In this case, the integer value can be obtained only by interpreting the dot pattern of eight pixels as a numeric value, so no translation is required. Therefore, it is sufficient if there is a table describing the minimum value J of the upper limit value and the maximum value K of the lower limit value corresponding to 256 dot patterns of 0-255 respectively for each pixel of the dither pattern DP. In other words, all of them can be described if there is a table for translating data of the number corresponding to the number of pixels of the dither pattern DP multiplied by 256. The table enables to extract values described at the position (the minimum value J and the maximum value K) easily at high speed from the position coordinates in the dither pattern DP and the integer value of the dot pattern. In this embodiment, the table is generated as the upper and lower limit table TJK in advance.

FIG. 8 is a diagram showing an example of the upper and lower limit table TJK.

The upper and lower limit table TJK shown in FIG. 8 indicates, for a certain dither pattern DP, a relationship among coordinates in the dither pattern DP, a dot pattern, a minimum value J of the upper limit value and a maximum value K of the lower limit value.

Therefore, the above-described low resolution area TL is divided into twelve blocks by eight pixels each, so that the minimum value J and the maximum value K are determined for each block. If the coordinates in the dither pattern DP of a certain block is (0,2) and the integer value of the dot pattern is "0" for example, it is understood from the upper and lower limit table TJK that the minimum value J is "255" and the maximum value K is "141".

The minimum value J and the maximum value K of the entire low resolution area TL are determined in accordance with the minimum value J and the maximum value K of each of twelve blocks obtained as described above. In other words, the minimum value J of the low resolution area TL is the minimum among twelve minimum values J while the maximum value K of the low resolution area TL is the maximum among twelve maximum values K.

In this way, using the upper and lower limit table TJK, the process for calculating the representative value "a" can be realized by reading data out of the upper and lower limit table TJK that has approximately 2 megabytes at most. Since reading out of the table can be performed at high speed, the representative value "a" can be determined fast. In addition, since even this process is a large load in the whole compression process, time necessary for the entire process can be shortened substantially.

Note that the upper and lower limit table TJK can be also used for determining whether or not the block of eight pixels matches the dither pattern DP.

As described above, the representative value "a" can be obtained from the obtained minimum value J and maximum value K. The representative value "a" can be a specific value or plural values in a certain range. However, in order to realize the dot pattern of the binary image data D1 in the printer 13, it is sufficient that the representative value "a" is only one value. Therefore, a method for narrowing the obtained representative value that varies in a certain range into one specific value will be described.

Figure 9:
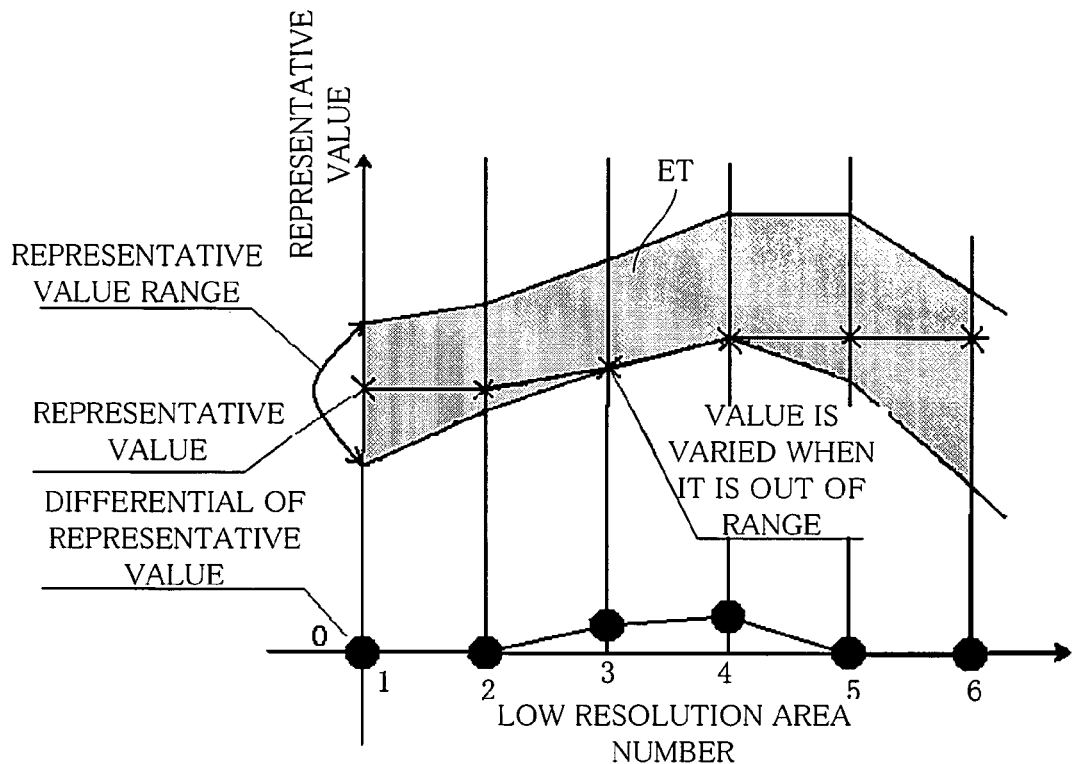
FIG. 9 is a diagram showing an example of a transition of a representative value of plural low resolution areas.

FIG. 9 is a diagram showing an example of a transition of a representative value of plural low resolution areas TL.

In FIG. 9, the horizontal axis indicates the number of the low resolution area TL, and the vertical axis indicates a representative value. As shown in FIG. 9, the representative value has a certain range ET. Therefore, the representative value "a" is determined so that a variation of the representative value "a" becomes as small as possible, i.e., so that a differential of the representative value "a" between neighboring low resolution areas TL becomes close to "0".

In other words, a representative value "a" of the first low resolution area TL in the leftmost in FIG. 9 is determined to be a median in the range, and a representative value "a" of the second low resolution area TL in the right neighbors location is set to the same value as the first representative value "a". The representative value "a" of the third low resolution area TL is determined so as to be within the range because the same value as the second representative value "a" will be out of the range. The representative value "a" of the fourth low resolution area TL is also determined so as to be within the range in the same manner as the third low resolution area TL. The representative value "a" of the fifth representative value "a" is set to the same value as the fourth representative value "a". A differential of the representative value "a" determined in this manner is shown at the lower position in FIG. 9. When the differential of the representative value "a" often becomes "0", deviation of frequency increases so that high compressibility can be obtained in encoding process by the Huffman method.

Since the representative value "a" can vary within the range of 0-255, the differential will vary within the range from −255 to +255 if a simple subtraction is performed. Therefore, it requires nine bits of information quantity to express the differential value. In this embodiment, however, the differential is obtained not by a simple subtraction but by regarding the representative value "a" as a circular integer within the range of 0-255. Thus, all values of the differential can be expressed by an integer within the range of 0-255. Therefore, the information quantity necessary for expressing the differential value is reduced to eight bits by half.

Next, a method for determining the differential by regarding the representative value as a circular integer will be described. For a simple description, the circular integer of 0-8 will be described.

Figure 10:
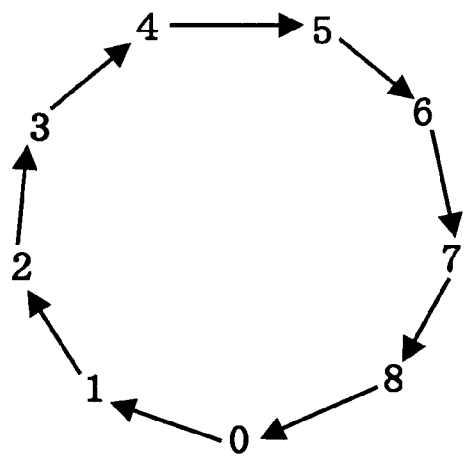
FIG. 10 is a diagram showing an example of a circular integer.

FIG. 10 is a diagram showing a circular integer of 0-8.

In FIG. 10, a certain number A is a reference, and a differential C between the reference and a certain number B is determined as follows. Starting at the position that the number A indicates in the circular integer, revolves counterclockwise by the number of position corresponding to the number B. Then the number of stop position is the differential C. For example, a differential between "5" and "3" is "2" that is obtained by revolving from the position "5" of the circular integer counterclockwise by three. In another example, a differential between "0" and "8" is "1" that is obtained by revolving from the position "0" of the circular integer counterclockwise by eight. In still another example, a differential between "3" and "5" is "7" that is obtained by revolving from the position "3" of the circular integer counterclockwise by five. In this way, a differential is obtained as an integer value within the range of 0-8.

In addition, a certain number A is determined by adding a differential C to a certain number B. In this case, from the position of the circular integer that a certain number B indicates, revolve clockwise by the number of position corresponding to the differential C. Then the number of stop position is the number A. In this way, complete reconstruction is realized.

Figure 11:
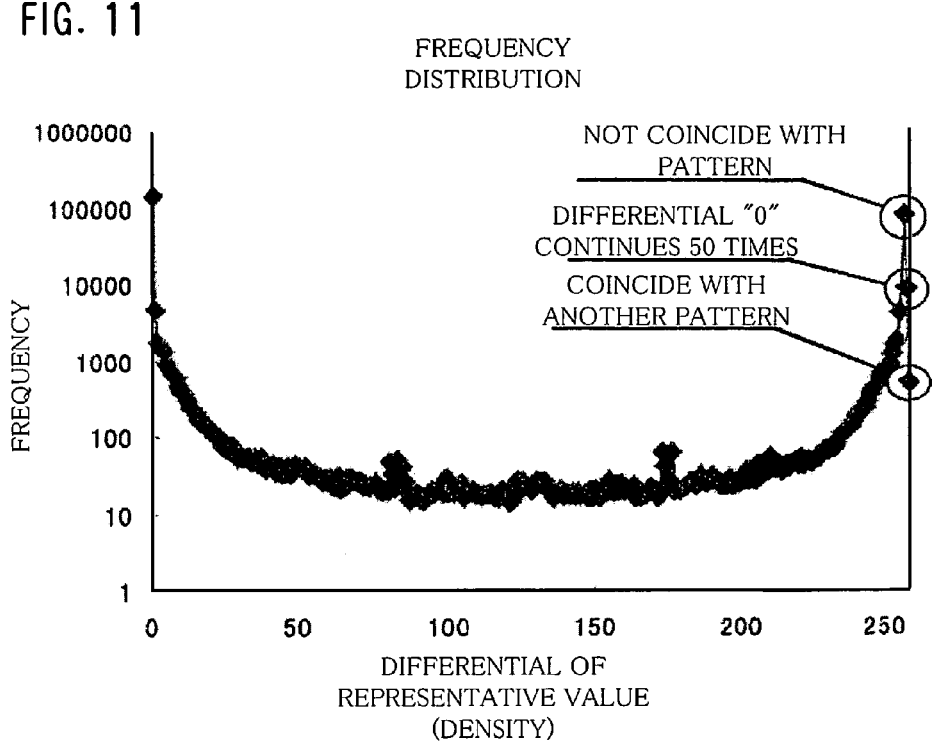
FIG. 11 is a diagram showing an appearance frequency distribution of a differential of the representative value in an image.

FIG. 11 is a diagram showing an appearance frequency distribution of a differential of the representative value "a" in an image.

As shown in FIG. 11, the appearance frequency is high in a range having a differential within the range of approximately "0"-"20" and "230"-"255". Such distribution is substantially the same regardless of a type of the image, and the deviation is very large. Therefore, most images can be compressed largely by the Huffman method using the differential.

Depending on an image, one low resolution area TL can be compressed to approximately 1-2 bits. In addition, probability of matching between the dot pattern of the low resolution area TL having 6×16 pixels and the dither pattern DP becomes approximately 95% in most images. In other words, original 96-bit data can be expressed with 1-2 bits in the area of approximately 95% of the whole area. At this time point, the compression can be performed with high compressibility of dozens of times.

Note that appearance frequencies about three values of "256", "257" and "258" are indicated after 0-255 that are differentials of the representative value "a" in FIG. 11. This is for indicating a predetermined state by specific three numbers when the state occurs so as to reduce further quantity of information and enhance the compressibility.

For example, there is often occurred a case where pixels having the same density continues long in an image. Therefore, if the same density continues over 50 areas as being described later, i.e., if the differential "0" continues 50 times, it is expressed by one attribution code of "257". The code "256" is the attribution code indicating that a certain low resolution area TL did not match any dither pattern DP, and the code "258" is the attribution code indicating that the dither pattern DP is switched, i.e., that a certain low resolution area TL matched another dither pattern DP after switching. If the dither pattern DP is switched two times, the code "258" is delivered two times.

As described above, the low resolution representative value calculating portion 103 determines the representative value "a" sequentially for low resolution areas TL and determines a differential between neighboring areas. Using the differential, the attribution value and the like, data to be transmitted to the encoding portion 108 are generated.

For example, if "0" continues 50 times as the differential, the attribution value "257" is delivered to the encoding portion 108. A value "0" of the differential is not delivered. If the differential "0" did not continue 50 times, "0" is delivered the number of times corresponding to the number of continuation, and then a differential that is not "0" is delivered. If the dither pattern DP is switched, the attribution code "258" is delivered the number of switching times. If the low resolution area TL did not match any dither pattern DP, the attribution code "256" is delivered. In this case, the low resolution area TL is processed by the medium resolution area dividing portion 104 that will be described next.

[Process of Medium Resolution Area and High Resolution Area]

Figure 12:
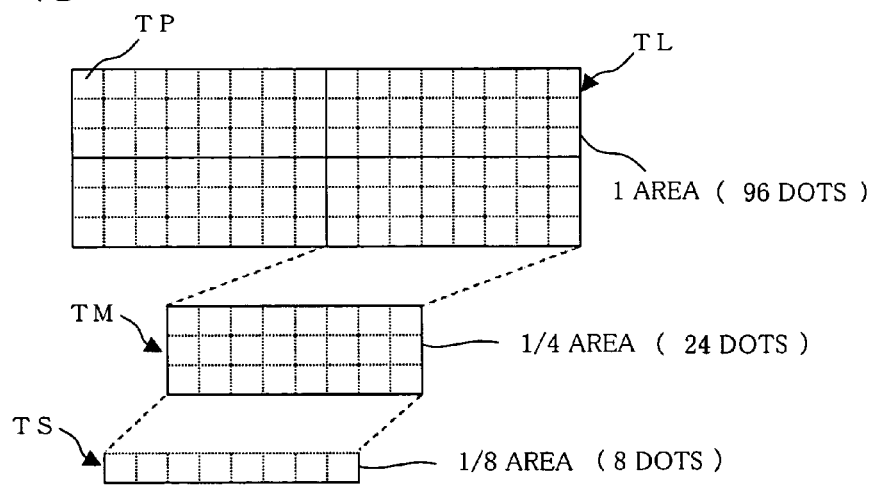
FIG. 12 is a diagram showing a low resolution area and a medium resolution area.
Figure 13:
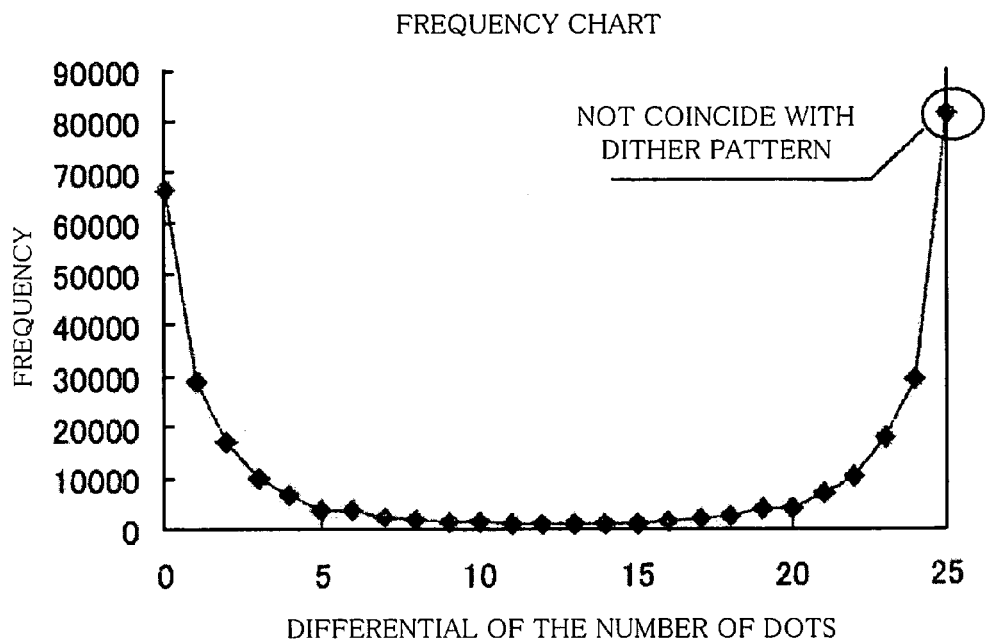
FIG. 13 is a diagram showing the appearance frequency distribution of a differential of the number of dots in an image.
Figure 14:
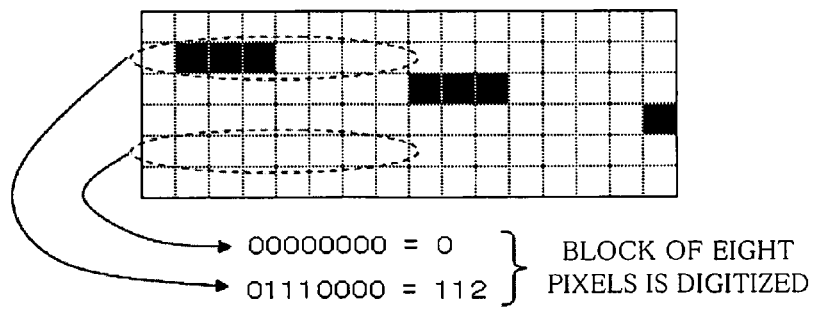
FIG. 14 is a diagram showing digitization of a dot pattern.
Figure 15:
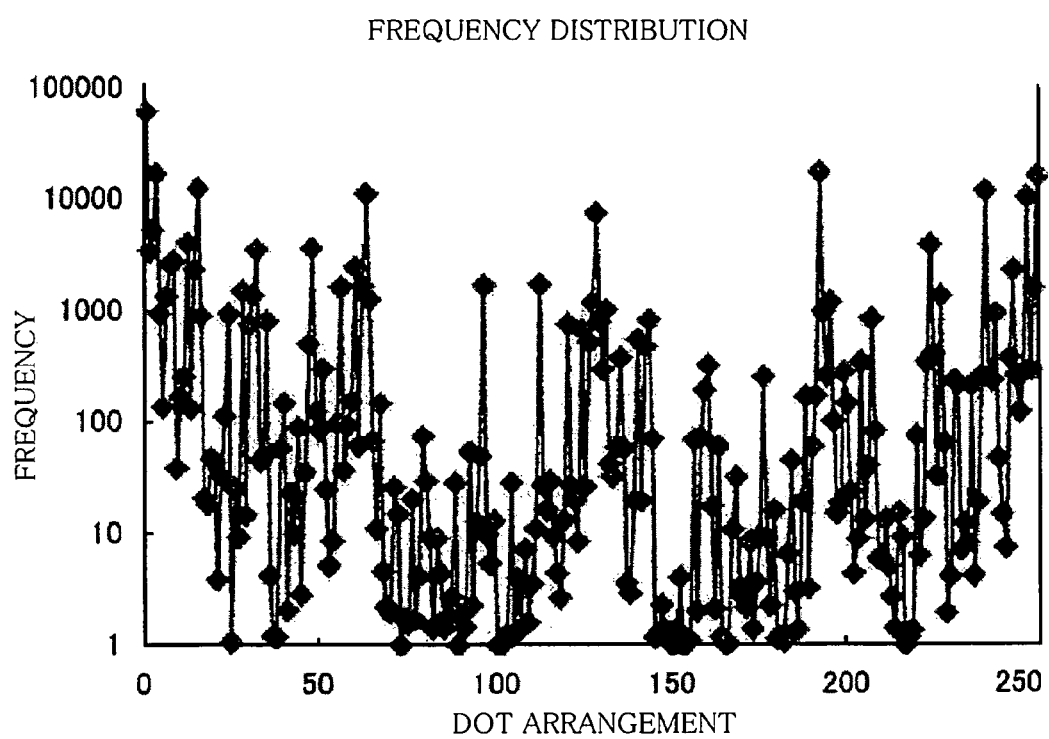
FIG. 15 is a diagram showing the appearance frequency distribution of each dot pattern.

FIG. 12 is a diagram showing a low resolution area TL and a medium resolution area TM, FIG. 13 is a diagram showing an appearance frequency distribution of a differential of the number of dots in an image, FIG. 14 is a diagram showing digitization of a dot pattern, and FIG. 15 is a diagram showing an appearance frequency distribution of each dot pattern.

The medium resolution area dividing portion 104 further divides the low resolution area TL into four medium resolution areas TM each of which includes 3×8 pixels as shown in FIG. 12.

The medium resolution comparing portion 105 determines whether or not a dot pattern of each medium resolution area TM matches a part of the dither pattern DP in the same method as the case of the low resolution area TL. In other words, since the medium resolution area TM is made up of three high resolution areas TS each of which includes eight pixels, it can be determined whether or not it matches the dither pattern DP by reading the minimum value J and the maximum value K three times out of the upper and lower limit table TJK described above and by summing them up. Note that the determination whether or not it matches the dither pattern DP is performed by the medium resolution area TM because frequency of matching increases with decreasing the area.

The medium resolution representative value calculating portion 106 determines the number of dots, e.g., the number of black dots in the medium resolution area TM as the representative value if the medium resolution area TM matches the dither pattern DP. Since the medium resolution area TM has 24 dots as a whole, information quantity is not so much even if the number of dots is regarded as the representative value. In addition, a speed of counting the number of dots is high. It is possible to reconstruct an original dot pattern from the number of dots. Then, a differential of the representative value between neighboring medium resolution areas TM is calculated in accordance with the obtained representative value in the same manner as the case of the above-described low resolution area TL. The differential is a value within the range of 0-24 because the above-described circular integer is used.

As shown in FIG. 13, the appearance frequency is high in the range where the differential is approximately "0"-"3" and "21"-"24". This distribution is substantially the same regardless of a type of the image, and the deviation thereof is very large. Therefore, a high compressibility can be obtained by using the differential. For example, compressibility of approximately ten times can be obtained.

Note that an appearance frequency about the value "25" is indicated after the differential 0-24 in FIG. 13. This reason is the same as the attribution code in the case of the low resolution area TL, and the code "25" is the attribution code indicating that a certain medium resolution area TM did not match any dither pattern DP.

Note that when the process of four medium resolution areas TM for one low resolution area TL is finished, the process for the low resolution area TL is performed again.

If the medium resolution area TM also did not match, the dot pattern extracting portion 107 further divides the medium resolution area TM into three high resolution areas TS of eight pixels, and a dot pattern of this high resolution area TS is digitized. In the digitization of a dot pattern, as shown in FIG. 14 for example, a dotted pixel is indicated by the binary number "1", while an undotted pixel is indicated by the binary number "0". Then, they are converted into decimal numbers, which are delivered as the attribution code.

As shown in FIG. 15, it is understood that the distribution is substantially uneven and concentrated at specific values. In this case too, therefore, a high compressibility can be obtained by the Huffman encoding. For example, a compressibility of approximately two times can be obtained.

When the process of three high resolution areas TS for one medium resolution area TM is finished, the process for the medium resolution area TM is performed again.

The encoding portion 108 encodes the entered data, i.e., a differential of the representative value "a", a differential of the number of dots, an attribution code and the like by using the Huffman method. The compression by the Huffman method is very effective in an object whose frequency distribution of signal does not vary largely. The Huffman method itself is known, so detailed description thereof will be omitted.

[Description of Huffman Code Table]

In this embodiment, the differential and the attribution code of the representative value "a" for the low resolution area TL, the differential and the attribution code of the number of dots for the medium resolution area TM, and the attribution code for the high resolution area TS are encoded by using the corresponding and independent first through third coders. For this purpose, three special Huffman code tables FH1-FH3 are provided for them, respectively.

FIGS. 16(a)-16(c) are diagrams showing examples of Huffman code tables FH1-FH3. FIG. 16(a) shows a Huffman code table FH1 of a first coder that is for the low resolution area, FIG. 16(b) shows a Huffman code table FH2 of a second coder that is for the medium resolution area, and FIG. 16(c) shows a Huffman code table FH3 of a third coder that is for the high resolution area. These will be described briefly.

In FIG. 16(a), the Huffman code table FH1 is provided with items of an input, an output code, an output digit number and the like. A relationship between the input and the output code is determined in advance by the Huffman encoding method in accordance with the appearance frequency of each piece of data. The output code is stored in a memory as four byte data actually, so upper digits of a code that is less than four digits substantially are filled with "0".

Data of an output code term corresponding to an input code term that matches the entered data are read out by the number of digits indicated in the term of the output digit number from the least significant digit. If the input is "3" for example, the code "1000100" that corresponds to seven digits of the output code " . . . 0001000100" is read out. The read code "1000100" becomes the compressed data D2.

The Huffman code tables FH2 and FH3 shown in FIGS. 16(b) and 16(c) are also provided with items of an input, an output code, an output digit number and the like similarly. Relationships between the input and the output code are independent of each other among three Huffman code tables FH1-FH3, and are determined in advance by the Huffman encoding method.

For example, if the input is "1" in the Huffman code table FH2, the code "1010" that corresponds to four digits of the output code " . . . 0001010" is read out. If the input is "1" in the Huffman code table FH3, the code "1010" that corresponds to four digits of the output code " . . . 0001010" is read out.

Although there is a case where the same code is obtained by the conversion using the Huffman code tables FH1-FH3, it can be recognized which one of the first through the third coders corresponds to the conversion, i.e., on which one of the high, the medium and the low resolution areas the compression was performed. Therefore, a decode table DC corresponding to the result can be selected so that the reconstruction is performed completely.

For example, when the encoding is performed, the first coder uses the Huffman code table FH1 for the low resolution area until the code "256" appears in the data. When the code "256" appears, the Huffman code is switched to the Huffman code table FH2 for the medium resolution area after the code "256" is encoded by the first coder. Then, encoding by the second coder continues until encoding of four medium resolution areas TM is finished. When the code "25" appears while encoding by the second coder is being performed, the Huffman code table is switched to the Huffman code table FH3 for the high resolution area after the code "25" is encoded by the second coder. Then, encoding by the third coder continues until encoding of three high resolution areas TS finishes. When the encoding of three high resolution areas TS finishes, the process goes back to encoding by the second coder. When the encoding of four medium resolution areas TM finishes, the process goes back to encoding by the first coder again. After that, input data are encoded sequentially in accordance with this rule so that the compressed data D2 are generated.

In addition, the compressed data generation portion 100 generates decode tables DC1-DC3 for reconstructing compressed data D2 that were encoded by using the Huffman code tables FH1-FH3.

The data transmitting portion 109 transmits the compressed data D2 generated by the encoding portion 108 to the printer 13. In addition, the data transmitting portion 109 transmits the entire dither pattern DP and the decode table DC to the printer 13 in advance.

Note that the decode table DC is generated in accordance with the appearance frequency of the data. The appearance frequency of each data can also be determined by executing an algorithm in this embodiment actually. For example, such a frequency table can be a table that is generated by summing up all the frequencies of dither patterns DP for the character area, the image area and the chart area for each of the C, M, Y and K colors. Although it is ideal that the frequency table is determined for each image to be compressed, sufficient compression performance can be obtained in accordance with the frequency table generated by summing up as described above without doing so. For the same reason, it is possible to use the same frequency table generated as described above for the character area, the image area, the chart area and other areas too for each of the C, M, Y and K colors.

[Reconstruction Process]

Next, the reconstruction process in the printer 13 will be described.

In FIG. 4, the printer 13 is made up of a dither pattern memory portion 360, a data reconstruction portion 300, a decode table memory portion 370, a line buffer 380 and the like.

The dither pattern memory portion 360 includes the same contents as the dither pattern DP that is stored in the dither pattern memory portion 160 of the computer main unit 11. Although this dither pattern DP is the one that was transmitted from the computer main unit 11 in advance, it is possible to store the same dither pattern DP in an appropriate memory that is embedded in the printer 13 in advance.

The decode table memory portion 360 stores the decode table DC that is transmitted from the computer 11.

The data reconstruction portion 300 refers to a predetermined dither pattern DP and decode table DC and reconstructs the compressed data D2 that were received from the computer 11 so as to reconstruct the dot pattern. In the reconstruction of the compressed data D2, a reconstruction process is performed first by a first decoder using the decode table DC1 for the low resolution area. Depending on a condition, a reconstruction process is performed by a second decoder using the decode table DC2 for the medium resolution area, or a reconstruction process is performed by the third decoder using the decode table DC3 for the high resolution area. In other words, the compressed data D2 that are encoded by the first through the third coders are reconstructed by the first through the third decoders, respectively.

FIG. 17 is a diagram showing an example of a decode table DC2.

In FIG. 17, the decode table DC2 includes items of the number of marks, root, child 0, child 1 and the like. The original data can be obtained by tracing the table from the position of root=24 sequentially in accordance with entered data. If the entered data are "011011" for example, it is started from the child 0 of root=24 because the first of the data is "0". Since the value of the child 0 of root=24 is "23" and the next value of the data is "1", the child 1 of the root=23 is referred to next. Since the value of the child 1 of root=23 is "22" and the next value of the data is "1", the child 1 of root=22 is referred to next. Similar process is repeated after that, and the process finishes when a value of the child 0 or the child 1 becomes a negative value. A sum of the value (negative value) obtained last and the number of marks ("26" in this case) is the original data. Similar process is performed from the next value of the data after that, and the process is repeated until expansion of the data is completed.

Concerning reconstruction of the dot pattern, the reconstruction process is performed first by the first decoder. If the value that was reconstructed by the decode table DC1 is "258", it indicates that the dither pattern DP is switched. If plural "258" continue, the dither pattern DP is switched sequentially by the number of continuation, and the dither pattern DP after the switching is set as the dither pattern (current dither pattern) DP that is used after that.

If the reconstructed value is "256", the succeeding process is switched to the reconstruction process by the second decoder using the decode table DC2 for the medium resolution area. If the reconstructed value is "257", it indicates that "0" has continued 50 times as the differential of the representative value. Therefore, the dot pattern is reconstructed for 50 areas by the current dither pattern DP using the same value as the representative value for the low resolution area TL that was calculated last time, and it is sent to the line buffer 380. If the end of a line appears before finishing the process of 50 areas, the remaining part is sent to the line buffer 380 as data of the next line. If the reconstructed value is not any of these, its value is the differential of the representative value. In this case, the representative value "a" for the low resolution area TL that was calculated last time is regarded as an initial value, and the differential is added to the initial value so as to obtain the representative value "a" this time. In this way, the representative values "a" of all the low resolution areas TL are obtained by accumulating the differential. If this time is the first time, the initial value is set to "0" for obtaining the representative value "a". Then, the dot pattern is reconstructed from the obtained representative value "a" and the current dither pattern DP and is sent to the line buffer 380.

In the reconstruction process by the second decoder, the reconstruction is performed using the decode table DC2 for the medium resolution area. If the value reconstructed by the second decoder is "25", the subsequent process is switched to the reconstruction process by the third decoder for the high resolution area. If the reconstructed value is not "25", the value is the differential of the representative value (the number of dots) of the medium resolution area TM. In this case, the representative value is determined by accumulation in the same manner as the case of the low resolution area. A dot pattern of the medium resolution area TM is reconstructed from the obtained representative value and current dither pattern DP. When the process about four medium resolution areas TM finishes, the process goes back to the reconstruction process by the first decoder.

In the reconstruction process by the third decoder, the reconstruction is performed by the decode table DC3 for the high resolution area. A result reconstructed by the third decoder indicates an arrangement of dots for eight pixels. The reconstruct process is repeated for three high resolution areas TS, so that a dot pattern of one medium resolution area TM is reconstructed. Thus, completion of one reconstruction process of the medium resolution area TM is counted, and the process goes back to the process by the second decoder that made the call.

In this way, the attribution codes "256" and "25" work as a code switching signal between areas. When the attribution code appears, switching from the first coder to the second coder or from the second coder to the third coder can be performed securely.

The line buffer 380 stores temporarily the binary image data that was sent from the data reconstruction portion 300. The binary image data stored in the line buffer 380 is delivered by every six lines for example and printed on paper.

[Description with Reference to Flowcharts]

Next, processes in the computer main unit 11 and the printer 13 will be described with reference to flowcharts.

Figure 18:
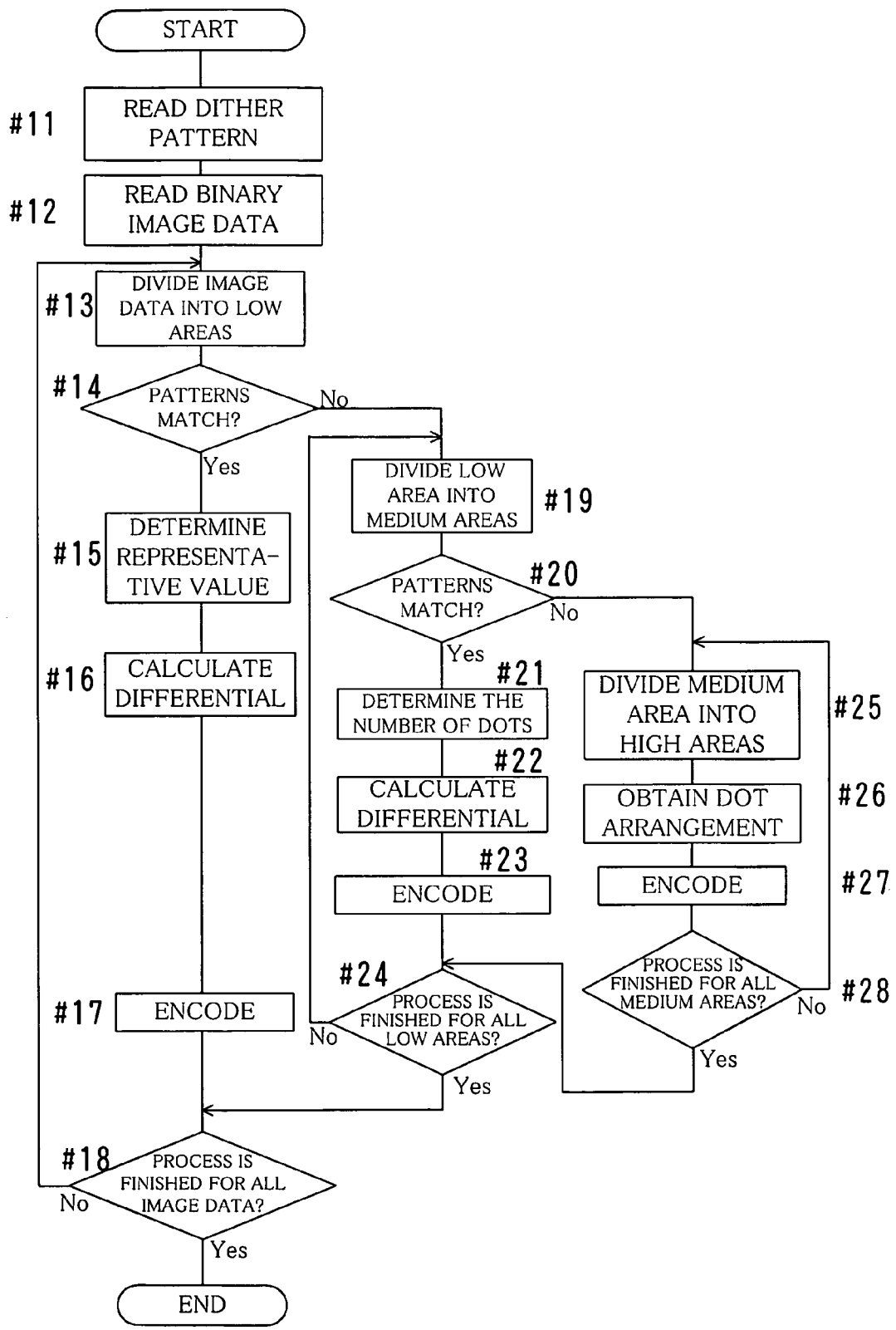
FIG. 18 is a flowchart showing a general flow of a compression process.
Figure 19:
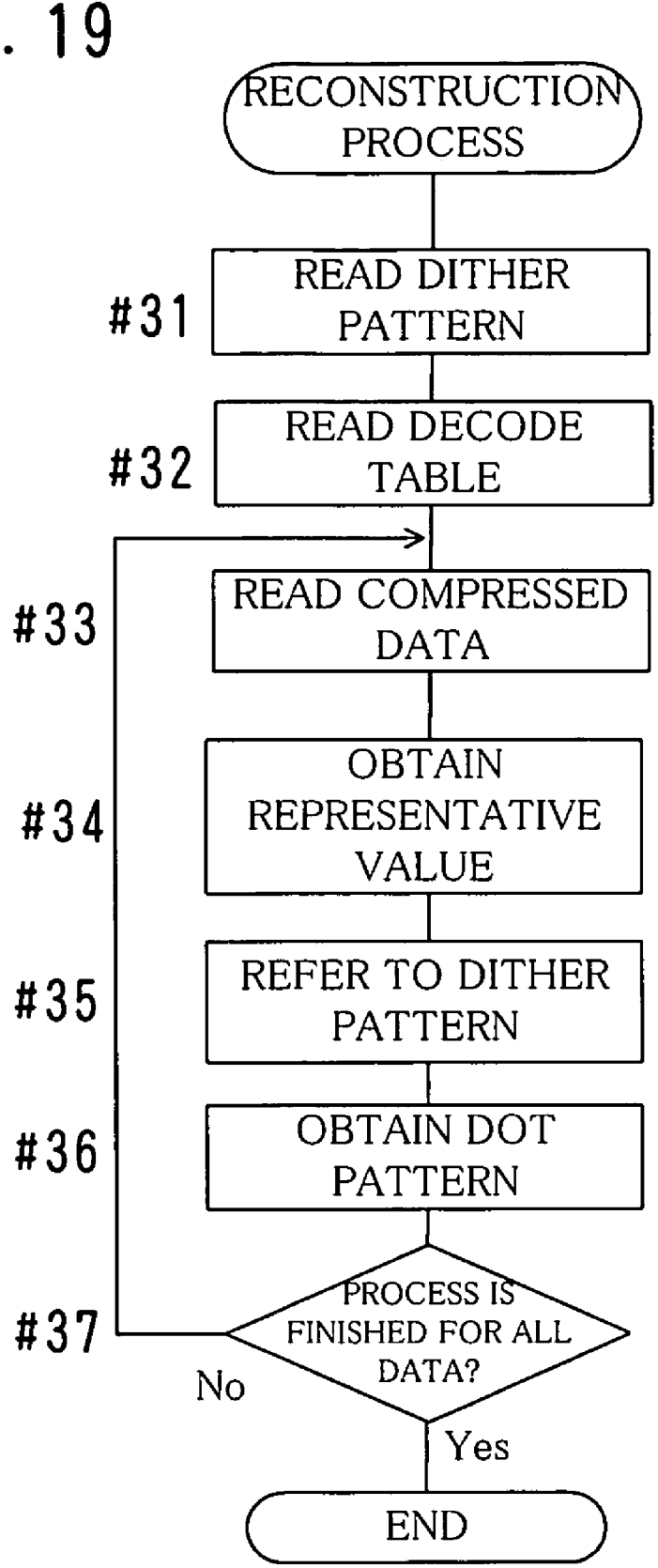
FIG. 19 is a flowchart showing a general flow of a reconstruction process.

FIG. 18 is a flowchart showing a general flow of a compression process in the computer main unit 11, and FIG. 19 is a flowchart showing a general flow of a reconstruction process in the printer 13.

As shown in FIG. 18, the dither pattern DP is read as preparation (#11), and then the binary image data D1 is read (#12). The binary image data D1 are divided into low resolution areas TL (#13), and it is determined whether or not one low resolution area TL matches the dither pattern DP (#14). If there are plural dither patterns DP, the dither patterns DP are switched until one of them matches the low resolution area TL. If they match each other (Yes in #14), the representative value "a" is determined (#15), and the differential is calculated (#16) and encoded (#17).

If the patterns do not match in the step #14, the low resolution area TL is divided into medium resolution areas TM (#19), and it is determined whether or not one medium resolution area TM matches the dither pattern DP (#20). If they match each other, the number of dots is determined (#21), and a differential between them is calculated (#22) and encoded (#23). If the patterns do not match in the step #20, the medium resolution area TM is divided into high resolution areas TS (#25), and a dot arrangement of the high resolution area TS is obtained (#26) and encoded (#27).

Such processes are repeated for all the read binary image data D1 (#18, #24 and #28).

As shown in FIG. 19, the dither pattern DP and the decode table DC are read as preparation (#31 and #32). The compressed data D2 are read (#33), and the representative value "a" is obtained (#34). Then, the dither pattern DP is referred to so that a dot pattern is obtained (#35 and #36). Note that description of reconstruction processes of the medium resolution area TM and the high resolution area TS are omitted.

Next, more detailed flowcharts will be referred to for description.

Figure 20:
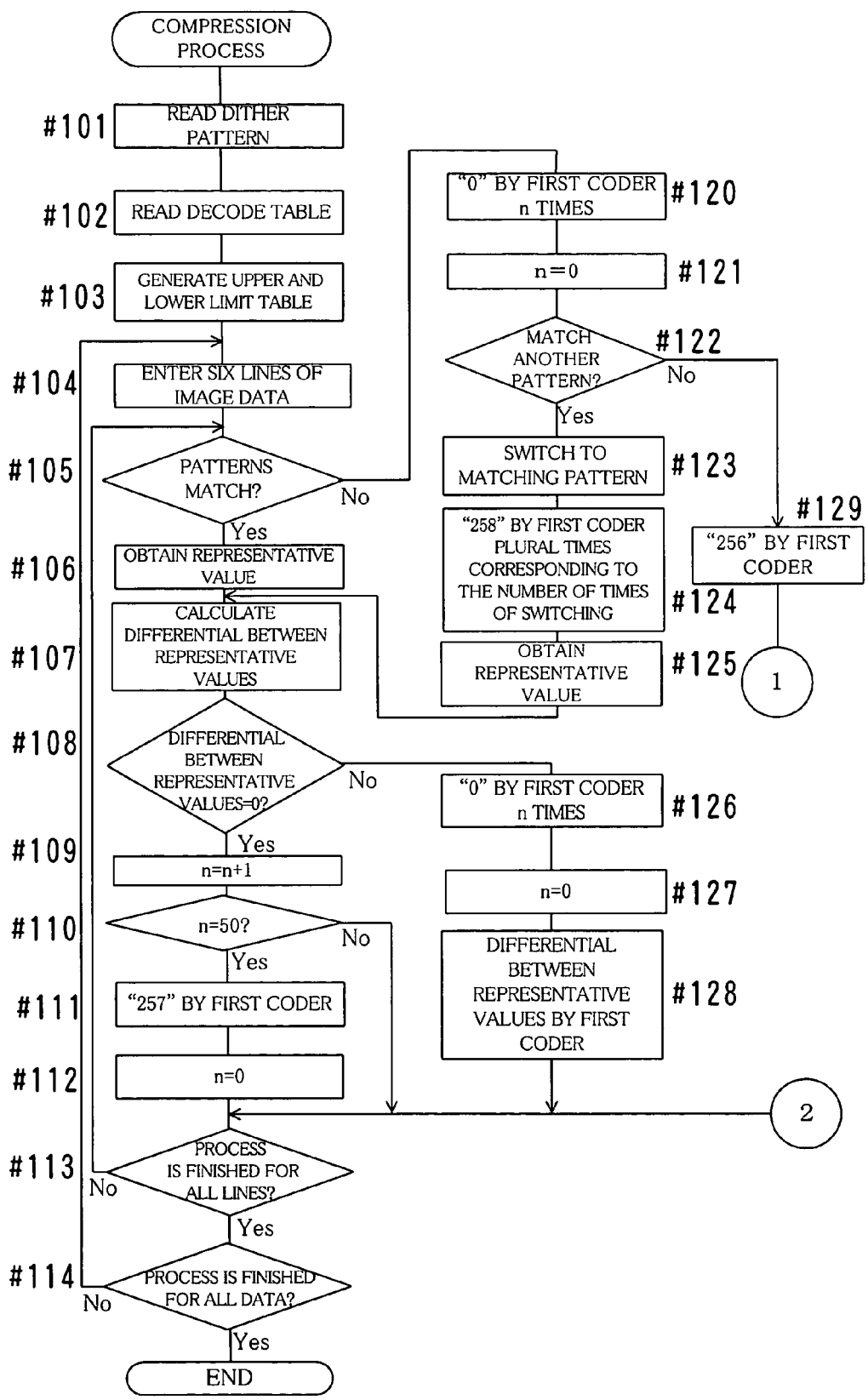
FIG. 20 is a flowchart of the compression process in the compressed data generation portion.
Figure 21:
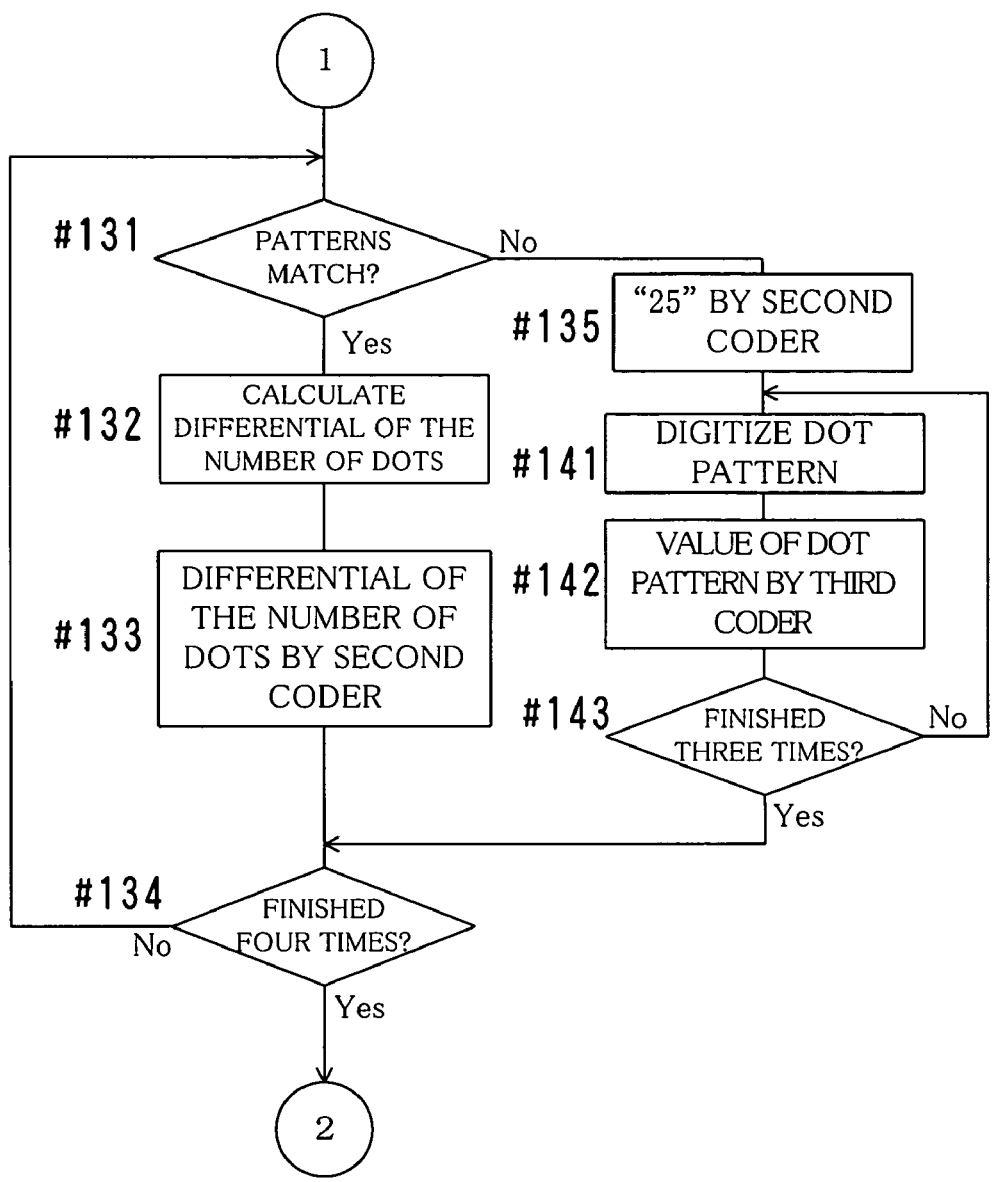
FIG. 21 is a flowchart of the compression process in the compressed data generation portion.
Figure 22:
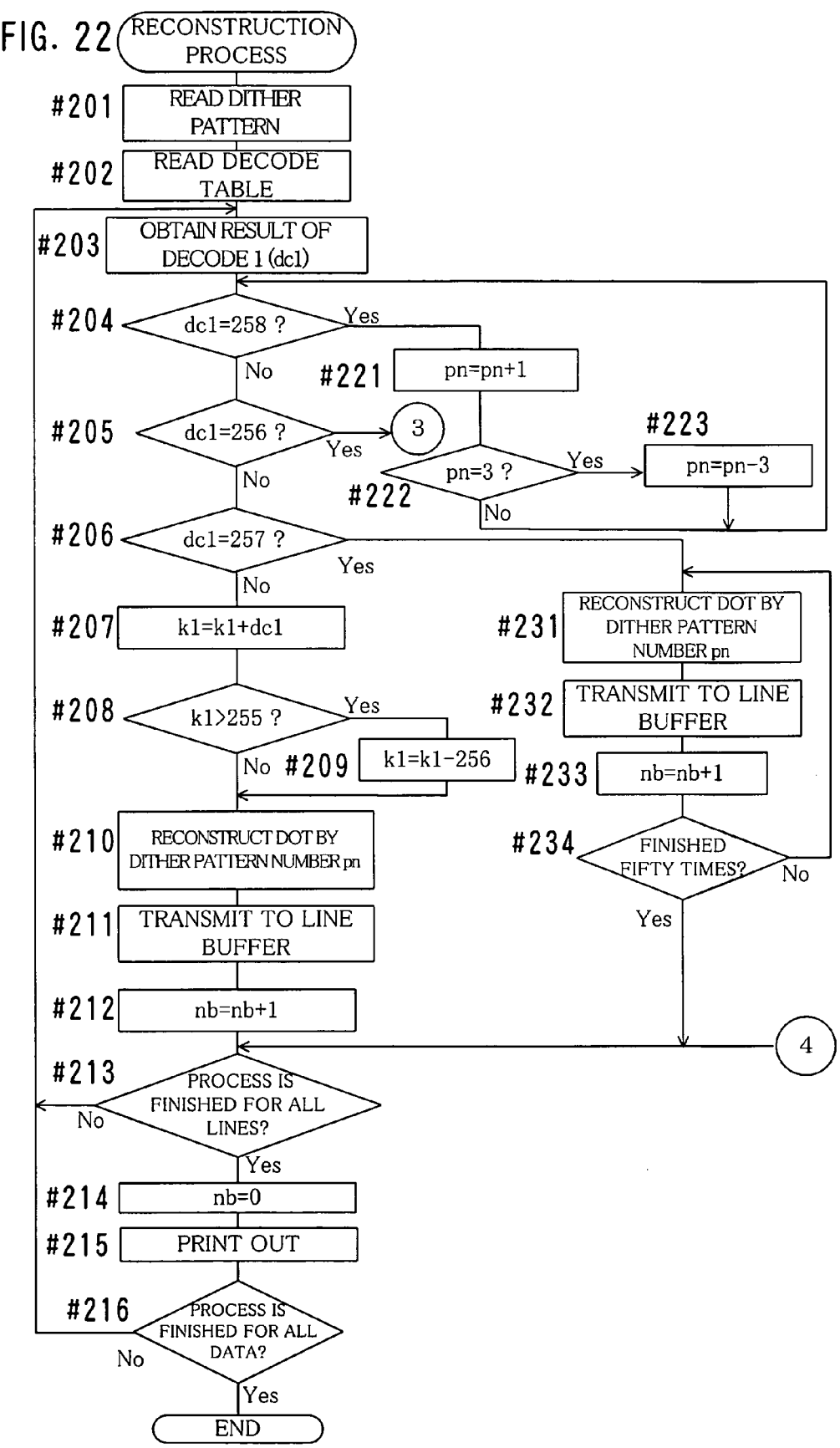
FIG. 22 is a flowchart of the reconstruction process in a data reconstruction portion.
Figure 23:
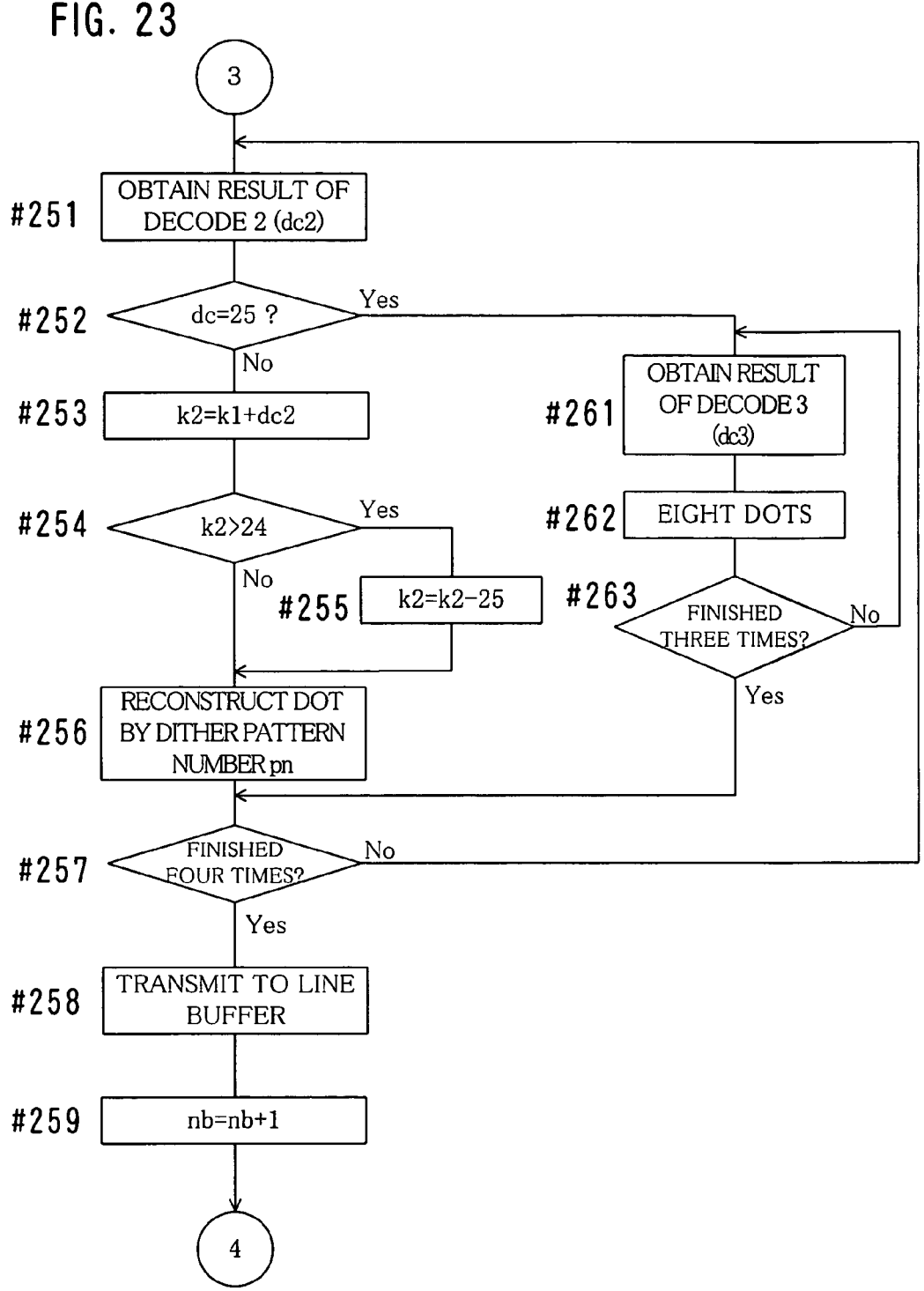
FIG. 23 is a flowchart of the reconstruction process in the data reconstruction portion.

FIGS. 20 and 21 are flowcharts of the compression process in the compressed data generation portion 100, and FIGS. 22 and 23 are flowcharts of the reconstruction process in the data reconstruction portion 300. Note that these flowcharts show processes about one color component of C, M, Y and K color components.

As shown in FIGS. 20 and 21, the dither pattern DP and the decode table DC are read first (#101 and #102). In addition, the dither pattern DP and the decode table DC are sent to the printer 13. The upper and lower limit table TJK is generated (#103). Six lines of the binary image data D1 are entered (#104), and it is determined whether one low resolution area TL matches the dither pattern DP starting from the left end (#105). If they match each other, the upper and lower limit table TJK is referred to so as to obtain the representative value "a" (#106), and a differential between the representative values is calculated (#107).

If the differential between representative values is "0" (Yes in #108), the variable n indicating the number of continuation is incremented (#109). If the variable n becomes "50" (Yes in #110), the attribution code "257" indicating that the differential between representative values "0" has continued 50 times is encoded by the first coder and delivered as the compressed data D2 (#111), and then the variable n is initialized to "0" (#112).

If it is "No" in the step #105, i.e., if one low resolution area TL does not match the dither pattern DP, the differential "0" between representative values is encoded and delivered by the first coder plural times corresponding to the number of times until then (#120), and the variable n is initialized to "0" (#121). Then, it is checked whether or not there is another matching dither pattern DP (#122). If there is a dither pattern DP that matches (Yes in #122), the dither pattern DP is switched (#123). The attribution code "258" indicating that the dither pattern DP is changed is encoded and delivered by the first coder plural times corresponding to the number of times of switching (#124). The representative value "a" is obtained (#225), and the process moves to the step #107.

If it is "No" in the step #108, i.e., if the differential between representative values is not "0" (No in #108), the differential between representative values "0" is encoded and delivered by the first coder plural times corresponding to the number of times until then (#126), and the variable n is initialized to "0" (#127). Then, the differential between representative values is encoded and delivered by the first coder (#128), and the process goes back to the step #113.

If the process is not completed to the right end of the entered six lines (No in #113), the step #105 and the subsequent steps are repeated so as to perform the process of the low resolution area TL on the right side sequentially in the same six lines. If the process is finished for the six lines (Yes in #113), and if there is a line that is not processed (No in #114), next six lines of the binary image data D1 are entered (#104). This is repeated until the process is finished for all of the binary image data D1 (#114).

If it is "No" in the step #122, i.e., if there is no matching dither pattern DP, the attribution code "256" indicating that the low resolution area TL does not match any dither pattern DP is encoded and delivered by the first coder (#129), and the process goes to the step #131 and subsequent processes that are processes of the medium resolution area TM.

In the process of the medium resolution area TM, it is determined whether one medium resolution area TM, which is obtained by dividing the low resolution area TL into four, matches one of the dither patterns DP (#131). If they match each other (Yes in #131), the number of dots in the medium resolution area TM is obtained. Then the differential is calculated (#132), and the differential of the number of dots is encoded and delivered by the second coder (#133). This is repeated four times, and the process goes back to the process of the low resolution area TL in the step #113.

If it is "No" in the step #131, i.e., if the medium resolution area TM did not match any of the dither patterns DP, the attribution code "25" indicating that they didn't match each other is encoded and delivered by the second coder (#135), and the process goes to the step #141 and subsequent steps that are the process of the high resolution area TS.

In the process of the high resolution area TS, a dot pattern of one high resolution area TS, which is obtained by dividing the medium resolution area TM into three, is digitized (#141), and the value thereof is encoded and delivered by the third coder (#142). This is repeated three times (#143), and the step goes back to the process of the medium resolution area TM in the step #134.

As shown in FIGS. 22 and 23, the dither pattern DP and the decode table DC are read first (#201 and #202). Then, the compressed data D2 are received from the computer main unit 11, and the process for reconstruction is performed from the head of the data. First, the reconstruction is performed by the first decoder (#203).

If a value dc1 obtained by the reconstruction is not the attribution code "258", "256" or "257" (No in #204-#206), the value dc1 is added to the accumulated value k1 up to then because the value dc1 is the differential of the representative value "a" so that the obtained value becomes a new accumulated value k1 (#206). If the accumulated value k1 exceeds "255" (Yes in #208), the value "256" is subtracted from the accumulated value k1 because it is above the maximum value of the representative value "a" (#209). Then, the accumulated value k1 is regarded as the representative value "a" for reconstructing the dot pattern by using the dither pattern DP that is defined by a pattern number pn (#210). The dot pattern is transmitted to the line buffer (#211), and one is added to the area number nb (#212). Note that the area number nb is a number that indicates a position in the six lines of the low resolution area TL to be processed.

The step #203 and subsequent processes are repeated until the expansion of the same six lines is finished (No in #213). If the expansion of the six lines is finished (Yes in #213), the area number nb is initialized to "0" (#214), and data (binary image data) of the expanded six lines are printed out (#215). This is repeated until the process is completed for all of the compressed data D2 (#216).

If it is "Yes" in the step #204, i.e., if the value dc1 obtained by the reconstruction is "258", "1" is added to the pattern number pn (#221). If the pattern number pn is "3" (Yes in #222), "3" is subtracted from the pattern number pn. In other words, the pattern number pn can be one of values "0", "1" and "2". Thus, one of three types of the dither pattern DP is specified.

If it is "Yes" in the step #206, i.e., if the value dc1 is "257", the accumulated value k1 is regarded as the representative value "a" for reconstructing the dot pattern by using the dither pattern DP specified by the pattern number pn (#231). The dot pattern is transmitted to the line buffer (#232), and "1" is added to the area number nb (#233). This is repeated 50 times (#234). Thus, the binary image data of 50 low resolution areas TL are reconstructed in accordance with the representative value "a" when the differential "0" continues 50 times. If the right end of the line appears during this process, the process is stopped temporarily, and the process of the step #214 and subsequent processes is performed so that the dot pattern is written newly from the head of the next line.

If it is "Yes" in the step #205, i.e., if the value dc1 is "256", the process goes to step #251 that is a process of the medium resolution area TM. In the step #251, the data are reconstructed by the second decoder. If the value dc2 obtained by the second decoder is not "25" (No in #252), the value dc2 is added to the accumulated value k2 up to then so that the obtained value becomes a new accumulated value k2 because the value dc2 is the differential of the number of dots (#253). If the accumulated value k2 exceeds "24" (Yes in #254), "25" is subtracted from the accumulated value k2 because it exceeds the maximum value of the number of dots (#255). Then, the accumulated value k2 is regarded as the number of dots for reconstructing the dot pattern by using the dither pattern DP specified by the pattern number pn (#256). This is repeated four times (#257). The dot pattern of four times is transmitted to the line buffer (#258), and "1" is added to the area number nb (#259).

If it is "Yes" in the step #252, i.e., if the value dc2 is "25", the process goes to step #261 that is a process of the high resolution area TS. In the step #261, the data are reconstructed by the third decoder (#261). An eight-dot pattern of the high resolution area TS is reconstructed from the reconstructed value (#262). This is repeated three times (#263).

As described above, the binary image data D1 are divided into the dither pattern information component and the image information component in the compression process. Then, only the image information component is extracted, and the encoding process is performed on it by the Huffman method so as to obtain the compressed data D2. Since the compressed data D2 do not include the dither pattern information component, high compressibility and a fast process can be realized.

In addition, the process of calculating the representative value "a" can be performed fast by reading data out of the upper and lower limit table TJK, which can contribute to shortening a whole process time substantially. In addition, an address is instructed fast in the process of the high resolution area TS because the image data of the eight pixels are read by one value instead. Thus, a whole process time can also be shortened.

In the printer 13, a cost of the ASIC that is used for reconstructing the compressed data D2 depends substantially on a size of a working area of an on-chip memory. As the working area for expansion process of data, an area for storing the read dither pattern DP and the decode table DC and an area for storing data of the area to be processed are necessary. Quantities of these data are, for example, between a few hundred bytes and a few kilobytes for the dither pattern DP, approximately 2 kilobytes for the decode table DC, and as a total approximately three or four kilobytes will be sufficient including other buffers. Therefore, if the printer 13 is equipped with a small scale ASIC having 3-4 kilobytes memory, the reconstruction process of the compressed data D2 can be performed fast. In addition, if the decode table DC is stored in the ROM, the capacity can be further reduced. In this way, the printer 13 can perform expansion of the compressed data D2 fast by small scale hardware. Thus, the entire process can be completed in a short time using an inexpensive printer 13.

In the above-described embodiment, the low resolution area dividing portion 101 shown in FIG. 3 divides the binary image data D1 into the low resolution areas TL, and various methods can be adopted as the dividing method. In other words, it is not necessary to divide the binary image data D1 actually into areas because the division can be imaginary. For example, it is possible that the low resolution comparing portion 102 designate an address for indicating a position to be compared. The structure of the compressed data generation portion 100 shown in FIG. 3 is merely an example, and various structures can be adopted for realizing the above-described functions.

In the above-described embodiment, the computer main unit 11 is provided with the pseudo gradation processing portion 170, which performs the binarization process of the image data FD. However, it is possible to enter the binary image data D1 externally without performing the binarization process inside the computer main unit 11. In this case, information of the dither pattern DP or the like that was used for the binarization process may be obtained.

In the above-described embodiment, it is possible to express the binary image data D1 by presence or absence of a flag indicating dotting or not dotting each pixel. It is possible to dot a pixel of high density or to dot a pixel of low density. Concerning the minimum value J and the maximum value K of the density value of the pixel for determining the representative value "a" too, it is possible to determine assuming the case where a pixel of low density is dotted or the case where a pixel of high density is dotted. In this way, it is possible to combine gradation property, a density value, a luminance value and whether it is dotted or not, variously.

Second Embodiment

Case where Image Data of Four Values are Compressed

Next, the case where image data of four values are compressed will be described. This case is basically the same as the case where image data of two values are compressed. Therefore, the description and the drawings for the first example can be applied to the second example substantially in the same manner. In most parts, the expression "two values" in the first example can be replaced with the expression "four values" for the description of the second example. Here, only the main difference between them will be described.

Figure 25:
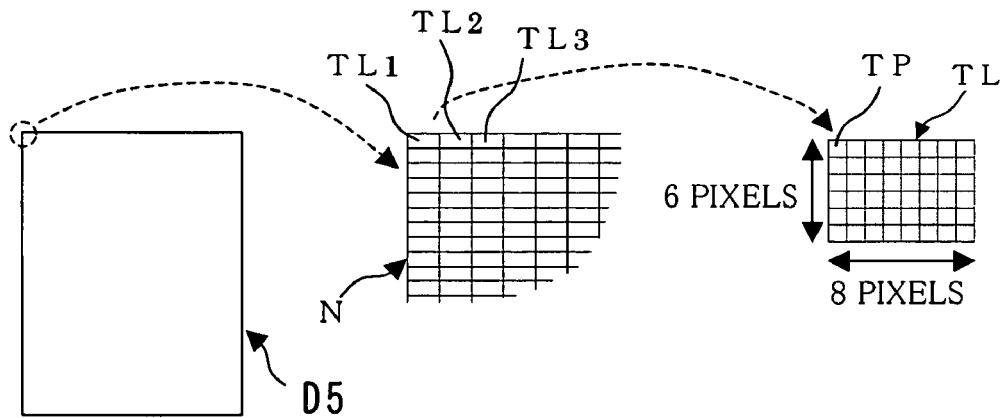
FIG. 25 is a diagram showing a divided low resolution area.
Figure 26:
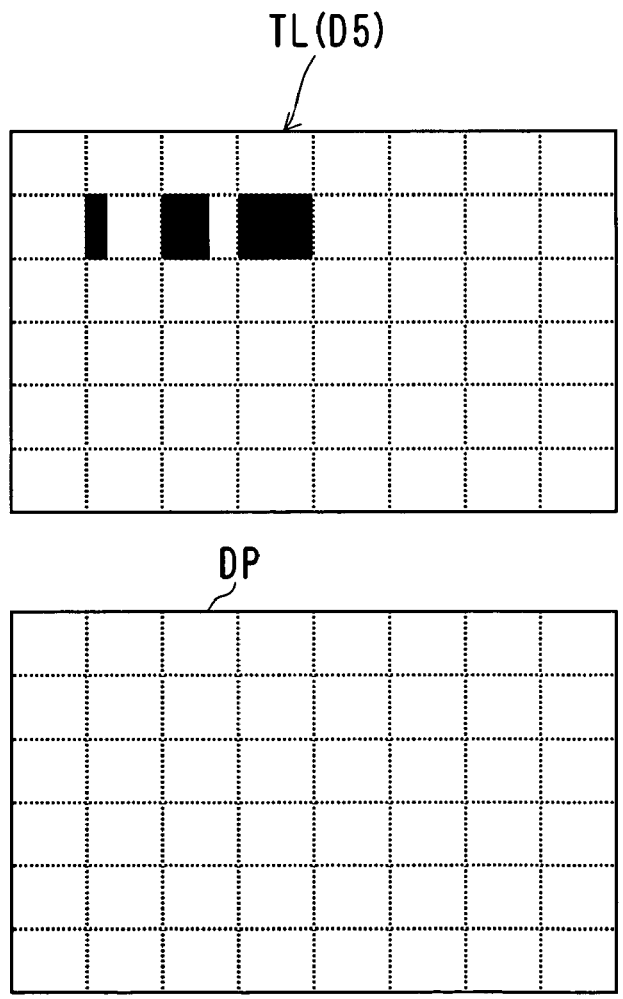
FIG. 26 is a diagram showing an example of low resolution areas and a dither pattern.
Figure 27:
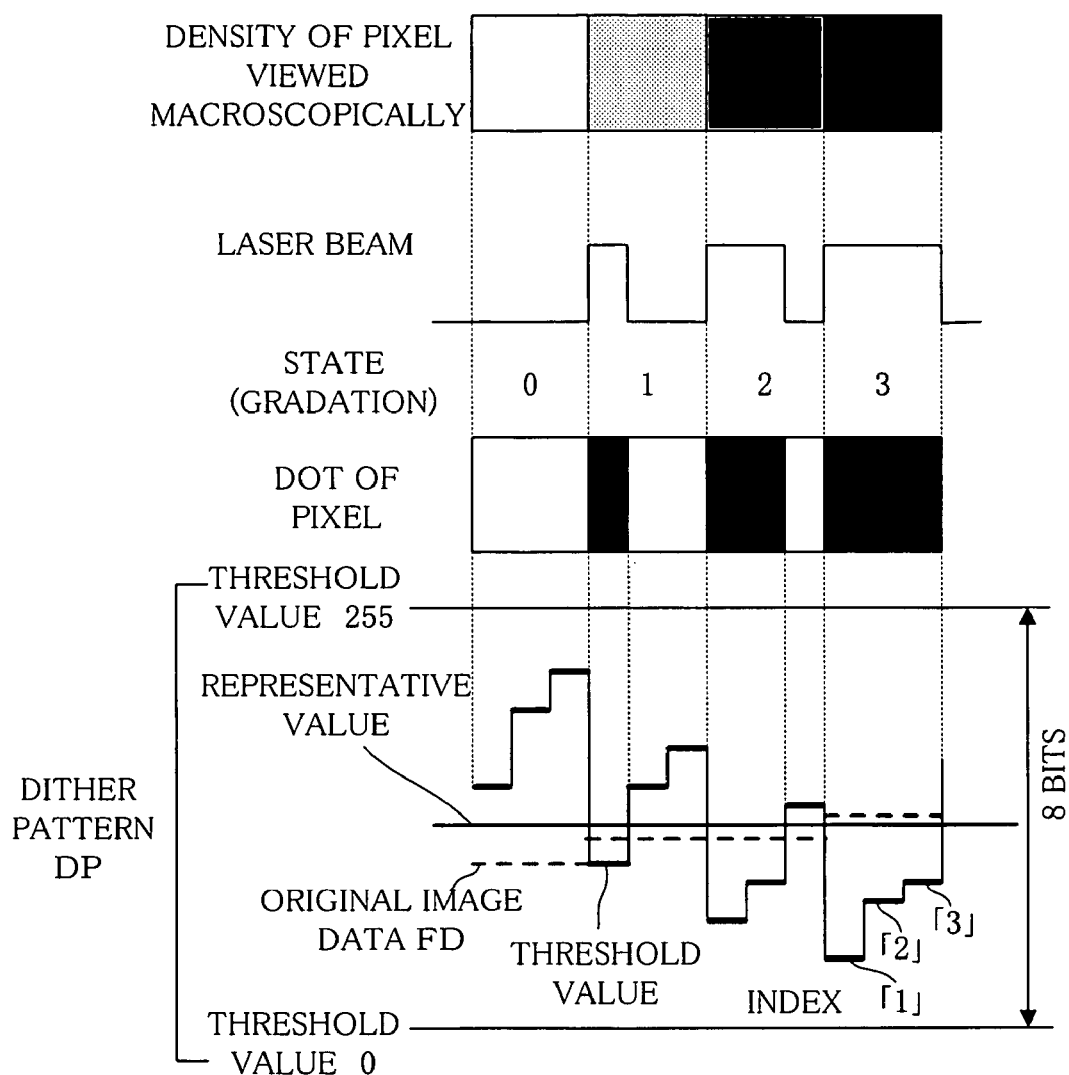
FIG. 27 is a diagram showing image data of four values.
Figure 28:
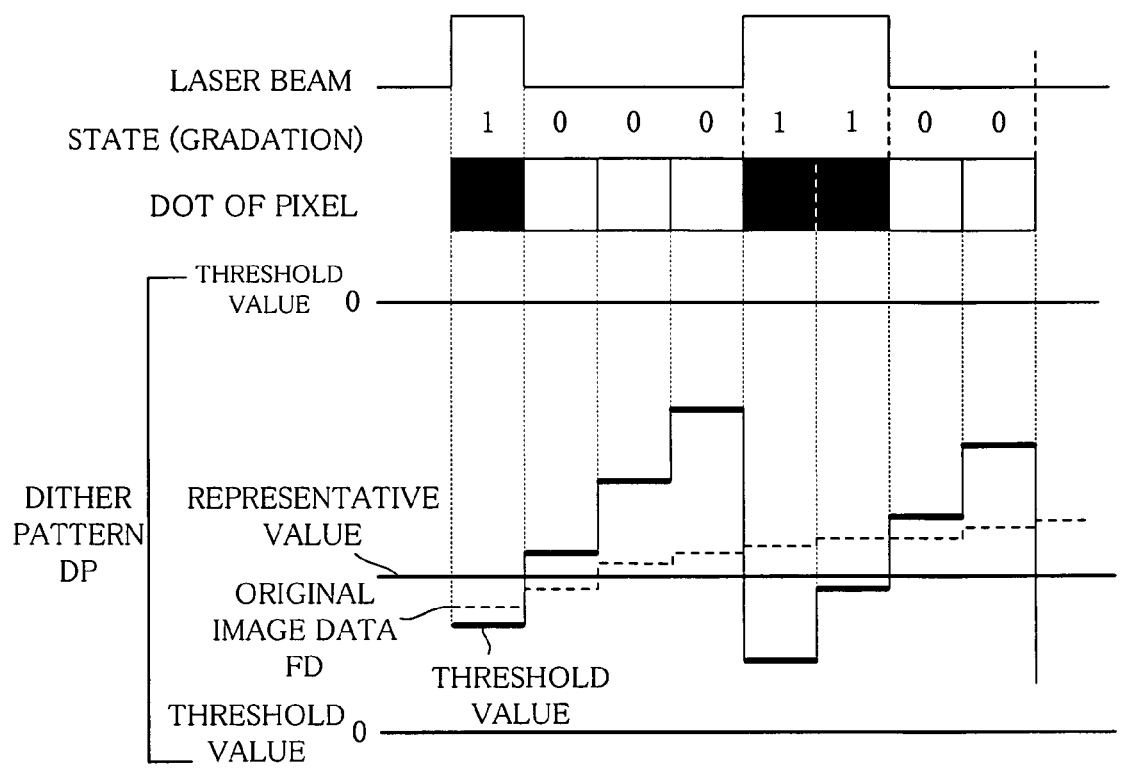
FIG. 28 is a diagram showing image data of two values.

FIG. 25 is a diagram showing a divided low resolution area TL, FIG. 26 is a diagram showing an example of low resolution areas TL and a dither pattern DP, FIG. 27 is a diagram showing image data of four values (four-value image data) D5, and FIG. 28 is a diagram showing image data of two values (binary image data) D1.

[Description of Four-Value Image Data]

As shown in FIG. 25, the low resolution area TL is a rectangular area including 48 (6×8) pixels TP. In the example shown in FIG. 25, the entire area of four-value image data D5 is divided into low resolution areas TL1, TL2, TL3, ... TLm from the upper left end.

In the low resolution area TL shown in FIG. 26, the black pixel is the dotted pixel. The dot size varies among three steps depending on the pixel value. In other words, the undotted state is expressed by "0", the state where the area of approximately one third of a pixel area is dotted is expressed by "1", the state where the area of approximately two thirds is dotted is "2", and the state where the whole area of one pixel is dotted is expressed by "3".

As shown in FIG. 27, a light emission period of a laser of the printer is controlled (pulse width control), for example, in accordance with each of the states "0", "1", "2" and "3", so that density of the pixel can be changed among four steps. In this way, these states "0", "1", "2" and "3" correspond to gradation values.

In other words, the laser does not emit light in the state "0" so that the pixel becomes "white". In the state "1", the laser emits light during period of approximately one third of the pixel width so that approximately one third of the pixel area becomes "black". Similarly in the state "2" or "3", the laser emits light during period of approximately two thirds and three thirds, respectively, so that approximately two thirds and the whole of the pixel area become "black". In other words, four-gradation density is obtained corresponding to the state value. Four states indicating four gradation values can be expressed with two bits. Therefore, eight bits can express four pixels of four gradation values.

Note that the relationship among the light emission period of the laser, a dot size made by the laser and density thereof viewed macroscopically is complicated, and the above-described example is merely an example for explanation.

The threshold value of the dither pattern DP is a value within the range of 0-255, and three threshold values are set for each pixel. In each pixel, indexes (numbers) of "1", "2" and "3" are assigned to three threshold values in ascending order. Image data FD having density that is smaller than the lowest threshold value of the index "1" become the state "0". Image data FD having density that is between threshold values of the index "1" and the index "2" become the state "1". Image data FD having density that is between threshold values of the index "2" and the index "3" become the state "2". Image data FD having density that is larger than the threshold value of the index "3" becomes the state "3". Normally, different pixels have different threshold values for the same index.

Here, the binary image data will be described too for comparison.

As shown in FIG. 28, in the binary image data, corresponding to each state "0" or "1", density of a pixel can be switched between two steps of white and black by controlling on and off of the laser of the printer, for example.

In other words, the laser does not emit light in the state "0" so that the pixel becomes "white". The laser emits light in the state "1" so that the pixel becomes "black". In other words, density of two gradation values is obtained corresponding to the state values.

[How to Determine Representative Value "a"]

It is supposed that if density value of each pixel of the image data FD is the threshold value or more of one of pixels corresponding to the dither pattern DP, it is dotted corresponding to the threshold value of the pixel. In other words, whether or not it is dotted in this case corresponds not to the pixel but to three threshold values of the pixel. Furthermore, the larger the density value is, the higher the density is.

In this case, if it is dotted by the threshold value of a certain pixel, it can be said that the density value of the pixel is the corresponding threshold value or higher. This can be said in other way such that the lower limit value of the density of the pixel is the same vale as the corresponding threshold value. On the contrary, if it is not dotted, it means that the density value of the pixel is smaller than the corresponding threshold value. This can be said in a different way such that the upper limit value of the density of the pixel is smaller than the corresponding threshold value by "1".

In this way, the upper limit value and the lower limit value of each threshold value assigned to each pixel of the dither pattern DP are summed up, so that the minimum value J of the upper limit value and the maximum value K of the lower limit value are determined. Then similarly to the above-described case, the value satisfying the relationship (2) is regarded as the representative value.

If there are plural values "a" that satisfy the relationship (2), i.e., if there is the representative value "a" in a certain range, a value among such representative values "a", in which a differential of the representative value between the neighboring areas becomes the minimum is used as the representative value "a".

[Low Resolution Area, Medium Resolution Area and High Resolution Area]

Figure 29:
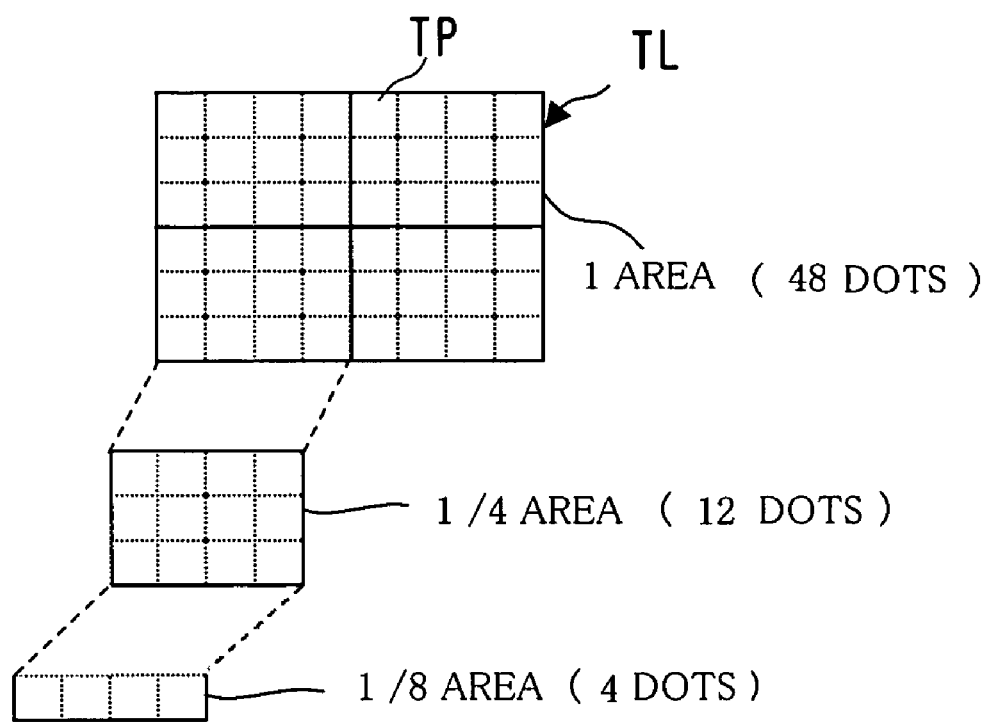
FIG. 29 is a diagram showing low resolution areas and medium resolution areas.

FIG. 29 is a diagram showing low resolution areas TL, medium resolution areas TM and a high resolution area TS.

As shown in FIG. 29, the low resolution area TL is an area including 6×8 pixels. The low resolution area TL is divided into four medium resolution areas TM including 3×4 pixels each by the medium resolution area dividing portion 104. The medium resolution area TM is further divided into three high resolution areas TS including 4 pixels each, if necessary.

[Process of Low Resolution Area]

A dot pattern of the low resolution area TL that is divided as shown in FIG. 25 is compared with the dither pattern DP similarly to the case of the first example, and it is determined whether or not they match each other. If they match each other, the representative value "a" is determined as described above. Subsequent process is the same as the case of the first example.

[Process of Medium Resolution Area]

Figure 30:
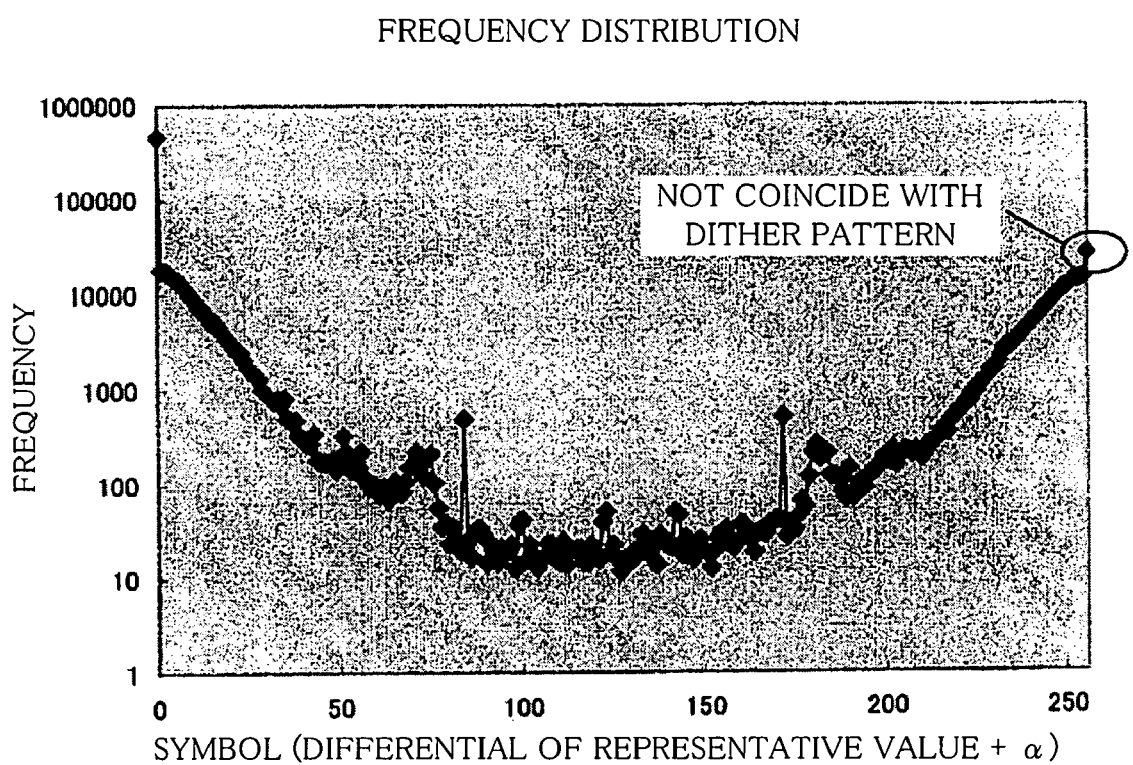
FIG. 30 is a diagram showing the appearance frequency distribution of the differential of the number of dots in an image.

FIG. 30 is a diagram showing the appearance frequency distribution of the differential of the number of dots in an image.

The medium resolution representative value calculating portion 106 determines the representative value "a" that satisfies the relationship (2) by the same process as the case of the low resolution area if the medium resolution area TM matches the dither pattern DP.

Then, in accordance with the obtained representative value "a", the differential of the representative value between neighboring medium resolution areas TM is calculated in the same way as the case of the low resolution area TL. The differential is in the range of 0-255 using the circular integer described above.

As shown in FIG. 30, when the differential is in the range of approximately "0"-"30" and the range of approximately "200"-"255", the appearance frequency is high. The appearance frequency about the value "256" is indicated after the differential 0-255. This meaning is the same as the attribution code in the case of the low resolution area TL, and "256" is the attribution code indicating that a certain medium resolution area TM did not match any one of the dither patterns DP.

In other words, if the medium resolution area TM did not match any dither pattern DP, the second coder delivers "256". Then, the area is further divided into high resolution areas TS.

In the case of the two values shown in the first example, the medium resolution area TM includes 24 pixels and 24 dots at most. Therefore, the number of dots in the area is counted and is regarded as the representative value. In the case of four values shown in the second example, however, sharing and fast process are given a high priority, and the density value is regarded as the representative value as described above.

[Description with Reference to Flowcharts]

Next, the process in the second example will be described with reference to flowcharts.

Figure 31:
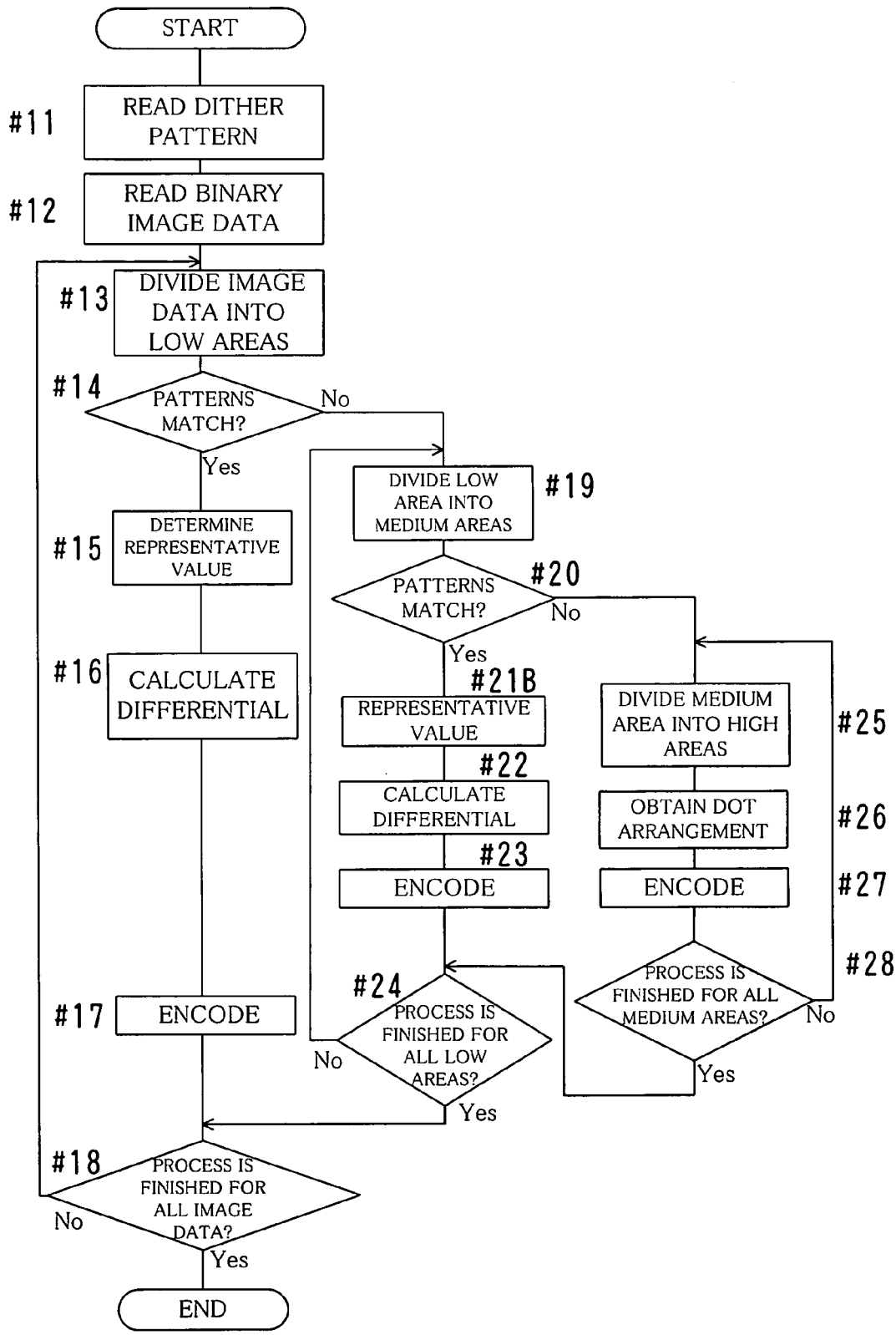
FIG. 31 is a flowchart showing a general flow of the compression process.

FIG. 31 is a flowchart showing a general flow of the compression process by the computer main unit 11. Note that FIG. 31 corresponds to FIG. 18 in the first example, and only step #21B is different.

In other word, as shown in FIG. 31, if one medium resolution area TM matches the dither pattern DP (Yes in #20), the representative value "a" is determined in the same way as the step #15 (#21B). Then, the differential between them is calculated (#22) and encoded (#23).

Figure 32:
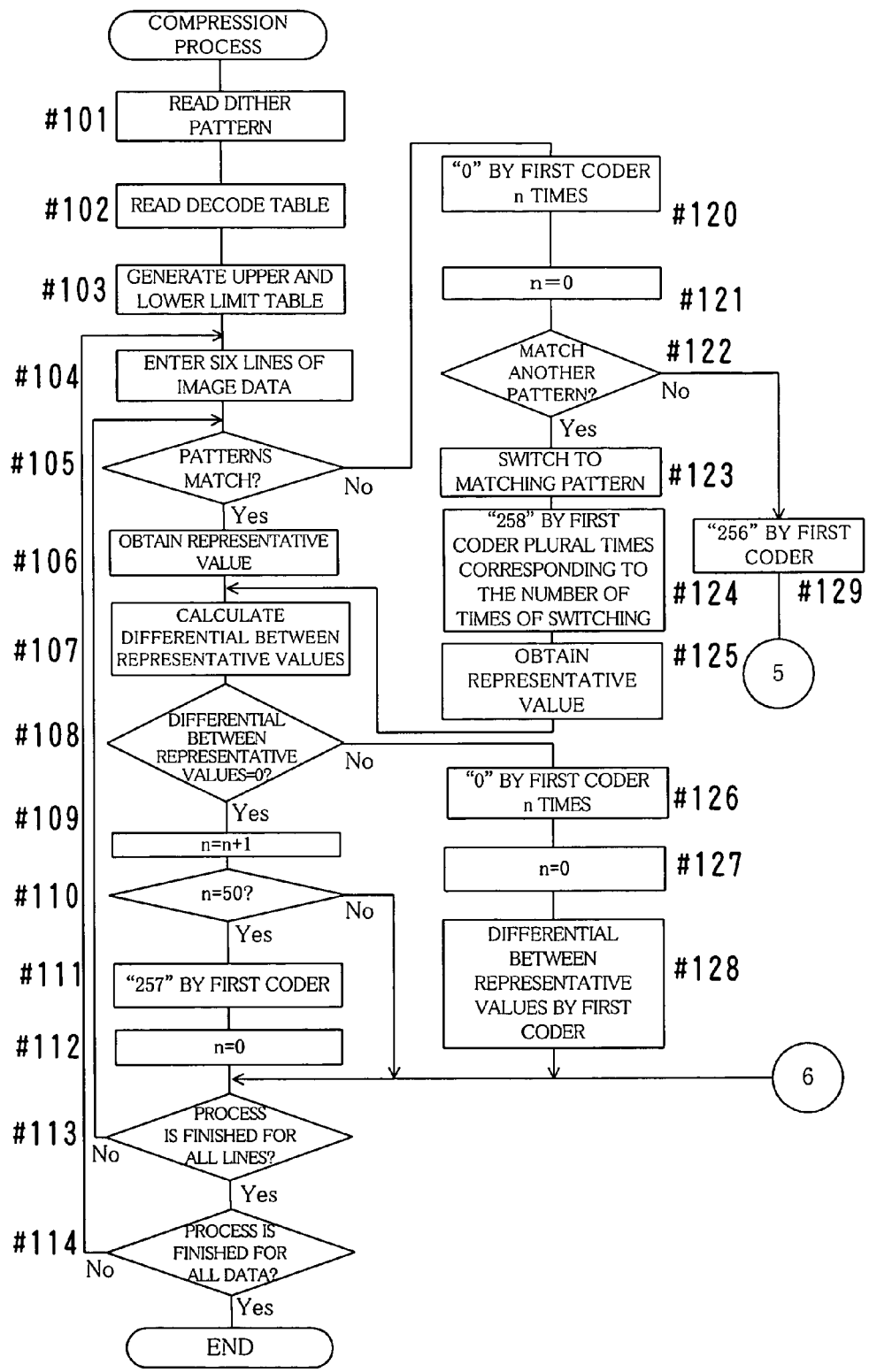
FIG. 32 is a flowchart of the compression process in the compressed data generation portion.
Figure 33:
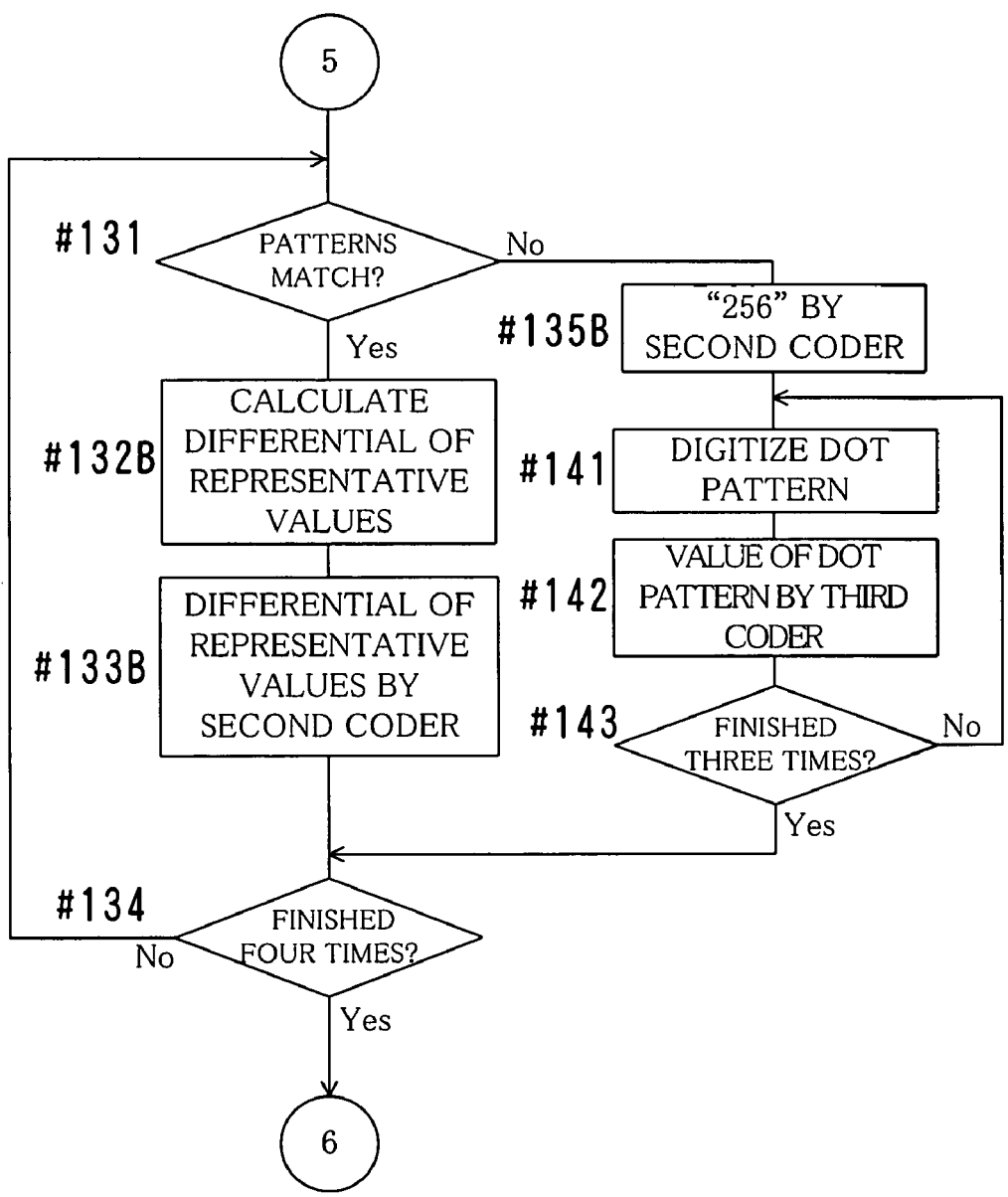
FIG. 33 is a flowchart of the compression process in the compressed data generation portion.
Figure 34:
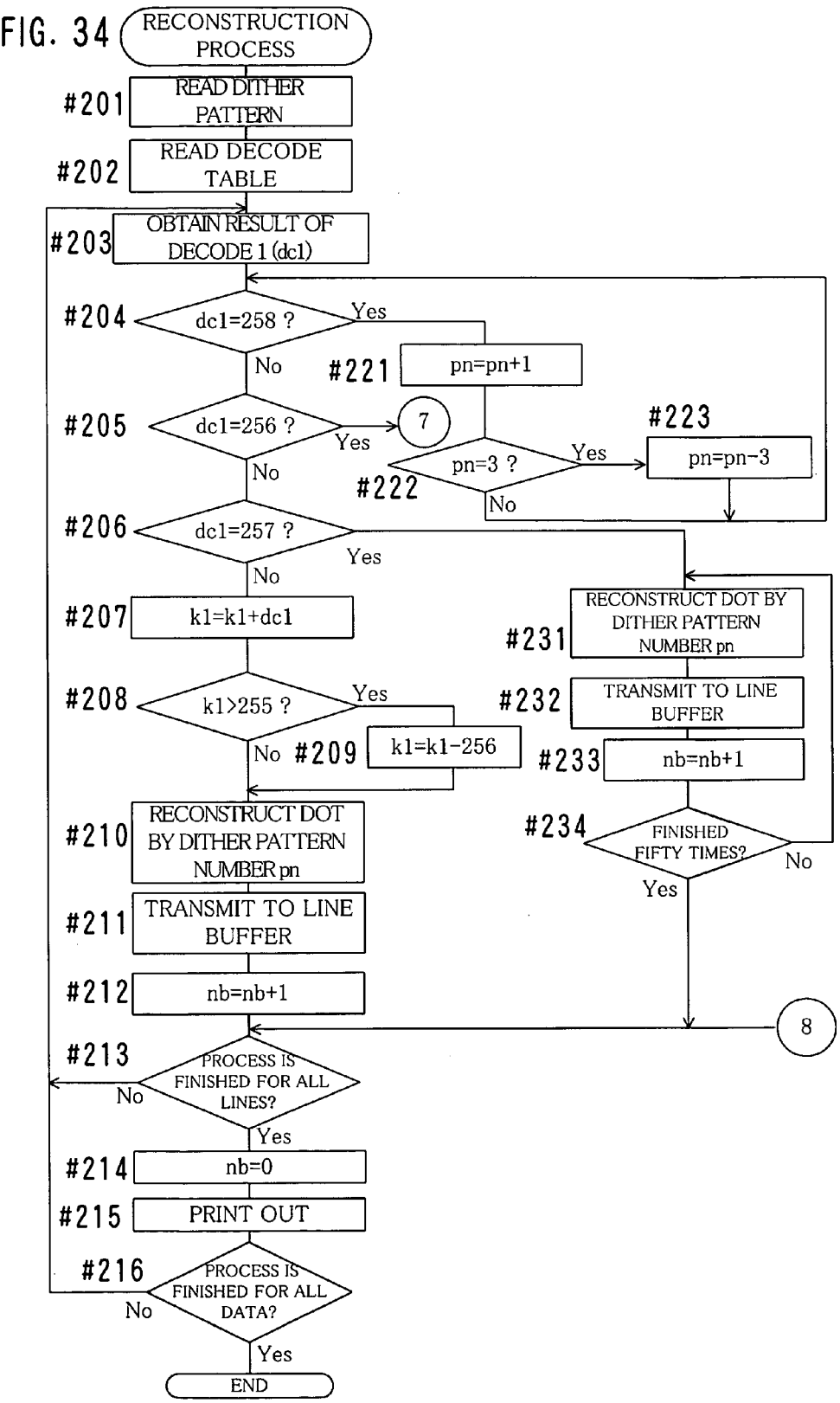
FIG. 34 is a flowchart of a reconstruction process in the data reconstruction portion.
Figure 35:
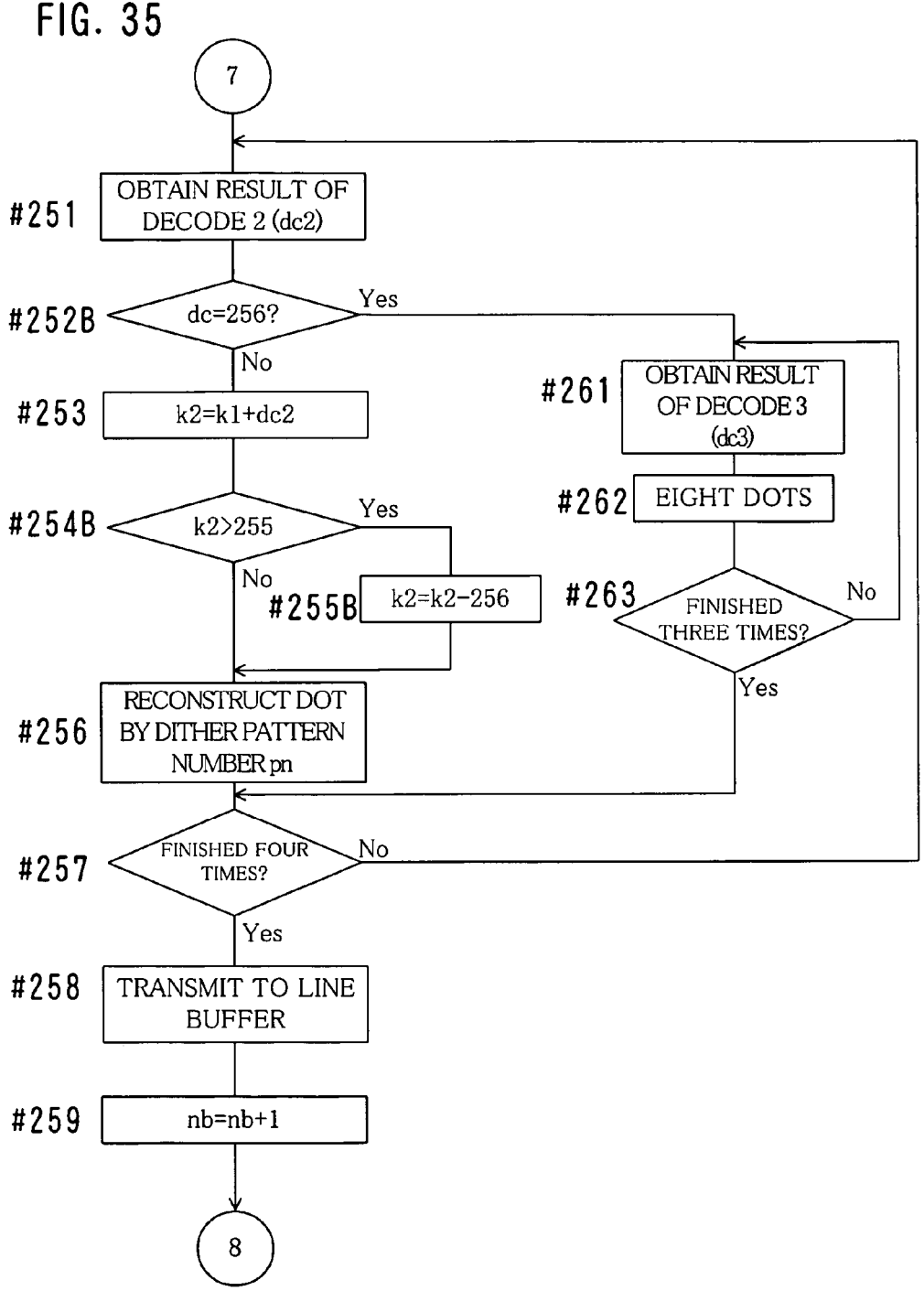
FIG. 35 is a flowchart of a reconstruction process in the data reconstruction portion.

FIGS. 32 and 33 are flowcharts of the compression process by the compressed data generation portion 100, and FIGS. 34 and 35 are flowcharts of the reconstruction process by the data reconstruction portion 300. Note that FIGS. 32-35 correspond to FIGS. 20-23 in the first example.

As shown in FIG. 33, if the medium resolution area TM matches one of the dither patterns DP (Yes in #131), the representative value "a" is obtained in the medium resolution area TM, and a differential between them is calculated (#132B). Then, the differential between representative values is encoded and delivered by the second coder (#133B). This is repeated four times, and the process goes back to the process of the low resolution area TL in the step #113 shown in FIG. 32.

If it is "No" in the step #131, i.e., if the medium resolution area TM did not match any one of the dither patterns DP, the attribution code "256" indicating that they didn't match each other is encoded and delivered by the second coder (#135B), and the process goes to the step #141 and subsequent steps that are the process of the high resolution area TS.

If the value dc2 obtained by the second decoder is not "256" in the step #252B shown in FIG. 35, the value dc2 is added to the accumulated value k2 up to then so that the obtained value is regarded as a new accumulated value k2 because the value dc2 is the differential of the representative value (#253). If the accumulated value k2 exceeds "255" (Yes in #254B), "256" is subtracted from the accumulated value k2 because it exceeds the maximum value of the representative value (#255B). Then, the accumulated value k2 is regarded as the representative value for reconstructing a dot pattern by using a dither pattern DP specified by the pattern number pn (#256).

If it is "Yes" in the step #252B, i.e., if the value dc2 is "256", the process goes to the step #261 that is the process of the high resolution area TS.

Note that in the reconstruction process a dithering process is performed by using the dither pattern DP that is attached to a part of the header of the compressed data D2. In the case of the binary image data, the representative value "a" is compared with the threshold value. If the representative value "a" is the threshold value or more, "1" is delivered. If the representative value "a" is less than the threshold value, "0" is delivered.

On the contrary, three threshold values are arranged in each pixel in the ascending order in the case of image data of four values. Therefore, the representative value "a" is compared with the threshold value, "1" is added to the value (0-3) of the index of the largest threshold value that is the representative value "a" or less, and the result is delivered. If there is no threshold value that is the representative value "a" or less, "0" is delivered.

Note that 15 threshold values are arranged in each pixel in the ascending order in the case of image data of ten values. Therefore, the representative value "a" is compared with the threshold value, "1" is added to the value (0-14) of the index of the largest threshold value that is the representative value "a" or less, and the result is delivered. If there is no threshold value that is the representative value "a" or less, "0" is delivered.

However, if the index is set to the value "1"-"4" in the case of the four values for example, the value of the index may be delivered without adding "1".

Although the binarization process and the four value process are performed as the pseudo gradation process in the embodiments described above, it is possible to perform various multi-value processes such as a three value process, an eight value process or a sixteen value process.

Furthermore, the structure of the whole or a part of the computer main unit 11, the printer 13 and the print system 1, the functions thereof, the number thereof, the number of bits, contents and orders of the process can be modified in accordance with the spirit of the present invention, if necessary.

The present invention can be used for a print system including a raster printer, a GDI printer or the like, and it can be used as a method for compressing image data that are processed by a pseudo gradation process.

While example embodiments of the present invention have been shown and described, it will be understood that the present invention is not limited thereto, and that various changes and modifications may be made by those skilled in the art without departing from the scope of the invention as set forth in the appended claims and their equivalents.

What is claimed is:

1. A method for compressing image data that are processed by a pseudo gradation process using a dither pattern, the method comprising the steps of:
   dividing the image data into predetermined areas;
   determining whether or not a dot arrangement pattern of the image data in each area matches a dot arrangement pattern that is obtained by a binarization process that uses imaginary uniform image data and the dither pattern;
   determining a representative value concerning density of the image data in the area if the dot arrangement pattern of the area matches the dot arrangement pattern for the imaginary uniform image data; and
   making compressed data by using the determined representative value;
   wherein the representative value is a value "a" that satisfies the condition $J \geq a \geq K$,
   wherein a dot for a given pixel is formed if a density value of the given pixel is smaller than a density value of a pixel in a corresponding part of the dither pattern, "J" is a minimum value of upper limit density values of pixels of the dither pattern corresponding to the dots that were formed in the area and "K" is a maximum value of lower limit density values of pixels of the dither pattern corresponding to dots that were not formed in the area;
   wherein the steps are performed by a computer.

2. The method according to claim 1, wherein a value having a minimum differential of the representative value between neighboring areas is used as the representative value.

3. The method according to claim 1, wherein when dots are made in a pattern area that was prepared in advance when the density value of each pixel of the image data in the area is compared with the density value of each pixel of a corresponding part of the dither pattern and the density value of each pixel of the image data is smaller than the other, the number of dots that were made or dots that were not made in the area is used as the representative value.

4. The method according to claim 1, wherein a differential of the representative value between each area and another area is determined, and the determined differential is encoded when the compressed data are made.

5. The method according to claim 1, wherein if there are plural dither patterns that were used for the pseudo gradation process, the plural dither patterns are switched, and it is determined whether or not one of them matches the dot arrangement pattern of the image data in the area.

6. The method according to claim 1, wherein if the dot arrangement pattern of the image data in the area does not match the dither pattern that was used in the pseudo gradation process, the area is further divided into plural small areas, and it is determined whether or not a dot arrangement pattern of the image data in each small area matches the dither pattern.

7. The method according to claim 6, wherein when dots are made in a pattern area that was prepared in advance when the density value of each pixel of the image data in the area is compared with the density value of each pixel of a corresponding part of the dither pattern and the density value of each pixel of the image data is smaller than the other, a value "a" is used as the representative value in the area, the value "a" satisfying the condition $$J \geq a \geq K$$

between a minimum value J of density values of pixels of the dither pattern corresponding to dots that were made in the area and a maximum value K of density values of pixels of the dither pattern corresponding to dots that were not made in the area, and the number of dots that were made or dots that were not made in the area is used as the representative value in the small area.

8. The method according to claim 6, wherein when dots are made in a pattern area that was prepared in advance when the density value of each pixel of the image data in the area is compared with the density value of each pixel of a corresponding part of the dither pattern and the density value of each pixel of the image data is larger than the other, a value "a" is used as the representative value in the area, the value "a" satisfying the condition $$J \geq a \geq K$$

between a maximum value K of density values of pixels of the dither pattern corresponding to dots that were made in the area and a minimum value J of density values of pixels of the dither pattern corresponding to dots that were not made in the area, and the number of dots that were made or dots that were not made in the area is used as the representative value in the small area.

9. The method according to claim 6, wherein when dots are made in a pattern area that was prepared in advance when the density value of each pixel of the image data in the area or the small area is compared with the density value of each pixel of a corresponding part of the dither pattern and the density value of each pixel of the image data is smaller than the other, a value "a" is used as the representative value in the area and the small area, the value "a" satisfying the condition $$J \geq a \geq K$$

between a minimum value J of density values of pixels of the dither pattern corresponding to dots that were made in the area or in the small area and a maximum value K of density values of pixels of the dither pattern corresponding to dots that were not made in the area or in the small area.

10. The method according to claim 6, wherein when dots are made in a pattern area that was prepared in advance when the density value of each pixel of the image data in the area or the small area is compared with the density value of each pixel of a corresponding part of the dither pattern and the density value of each pixel of the image data is larger than the other, a value "a" is used as the representative value in the area and the small area, the value "a" satisfying the condition $$J \geq a \geq K$$

between a maximum value K of density values of pixels of the dither pattern corresponding to dots that were made in the area and a minimum value J of density values of pixels of the dither pattern corresponding to dots that were not made in the area.

11. The method according to claim 6, wherein a differential of the representative value between each area and another area is determined, and the determined differential is encoded when the compressed data are made.

12. The method according to claim 6, wherein if the dot arrangement pattern of the image data in the area or the small area does not match the dither pattern that was used in the pseudo gradation process, an arrangement of dots that were made or dots that were not made in the area or the small area is encoded so as to make the compressed data.

13. The method according to claim 1, wherein the image data that are processed by the pseudo gradation process are binary image data.

14. The method according to claim 1, wherein the image data that are processed by the pseudo gradation process are multi-valued image data.

15. A method for expanding image data that are compressed by the method according to claim 1, the method comprising the steps of:

obtaining a representative value of each area from the compressed image data; and comparing the obtained representative value with the dither pattern for reconstructing the dot pattern.

16. The method according to claim 1, wherein if the dot arrangement pattern of the image data in the area does not match the dither pattern that was used in the pseudo gradation process, an arrangement of dots that were made or dots that were not made in the area or the small area is encoded so as to make the compressed data.

17. A method for compressing image data that are processed by a pseudo gradation process using a dither pattern, the method comprising:

a first step for dividing the image data into predetermined areas;

a second step for determining whether or not a dot arrangement pattern of the image data in each area matches a dot arrangement pattern that is obtained by a binarization process that uses imaginary uniform image data and the dither pattern;

a third step that is performed if the patterns match each other in the second step, for determining a representative value concerning density of the image data in the area when dots are made in the pattern area that was prepared in advance when a density value of each pixel of the image data in the area is compared with a density value of each pixel of a corresponding part of the dither pattern and the density value of each pixel of the image data is smaller than the other, the representative value being a value "a" that satisfies the condition $J \geq a \geq K$, wherein "J" is a minimum value of upper limit density values of pixels of the dither pattern corresponding to the dots that were formed in the area and "K" is a maximum value of lower limit density values of pixels of the dither pattern corresponding to dots that were not formed in the area;

a fourth step that is performed if the patterns do not match each other in the second step, for dividing the area further into plural small areas and for determining whether or not a dot arrangement pattern of the image data in each small area matches the dither pattern;

a fifth step that is performed if the patterns match each other in the fourth step, for determining the number of dots that were made or dots that were not made in the area as the representative value in the small area;

a sixth step that is performed if the patterns do not match each other in the fourth step, for encoding the dot arrangement in the small area; and a seventh step that is performed if the patterns match each other in the second step or the fourth step, for encoding in accordance with the determined representative value;

wherein the steps are performed by a computer.

18. The method according to claim 17, wherein a value having a minimum differential of the representative value between neighboring areas is used as the representative value.

19. The method according to claim 17, wherein a differential of the representative value between each area and another area is determined, and the determined differential is encoded in the seventh step.

20. A method for compressing image data that are processed by a pseudo gradation process using a dither pattern, the method comprising:

a first step for dividing the image data into predetermined areas;

a second step for determining whether or not a dot arrangement pattern of the image data in each area matches a dot arrangement pattern that is obtained by a binarization process that uses imaginary uniform image data and the dither pattern;

a third step that is performed if the patterns match each other in the second step, for determining a representative value concerning density of the image data in the area when dots are made in a pattern area that was prepared in advance when a density value of each pixel of the image data in the area is compared with a density value of each pixel of a corresponding part of the dither pattern and the density value of each pixel of the image data is larger than the other, the representative value being a value "a" that satisfies the condition J≧a≧K, wherein "J" is a minimum value of upper limit density values of pixels of the dither pattern corresponding to the dots that were formed in the area and "K" is a maximum value of lower limit density values of pixels of the dither pattern corresponding to dots that were not formed in the area;

a fourth step that is performed if the patterns do not match each other in the second step, for dividing the area further into plural small areas and for determining whether or not a dot arrangement pattern of the image data in each small area matches the dither pattern;

a fifth step that is performed if the patterns match each other in the fourth step, for determining the number of dots that were made or dots that were not made in the area as the representative value in the small area;

a sixth step that is performed if the patterns do not match each other in the fourth step, for encoding the dot arrangement in the small area; and a seventh step that is performed if the patterns match each other in the second step or the fourth step, for encoding in accordance with the determined representative value;

wherein the steps are performed by a computer.

21. The method according to claim 20, wherein a value having a minimum differential of the representative value between neighboring areas is used as the representative value.

22. The method according to claim 20, wherein a differential of the representative value between each area and another area is determined, and the determined differential is encoded in the seventh step.

23. A method for compressing image data that are processed by a pseudo gradation process using a dither pattern, the method comprising:

a first step for dividing the image data into predetermined areas;

a second step for determining whether or not a dot arrangement pattern of the image data in each area matches a dot arrangement pattern that is obtained by a binarization process that uses imaginary uniform image data and the dither pattern;

a third step that is performed if the patterns match each other in the second step, for determining a representative value concerning density of the image data in the area when dots are made in a pattern area that was prepared in advance when a density value of each pixel of the image data in the area is compared with a density value of each pixel of a corresponding part of the dither pattern and the density value of each pixel of the image data is larger than the other, the representative value being a value "a" that satisfies the condition J≧a≧K wherein "J" is a minimum value of upper limit density values of pixels of the dither pattern corresponding to the dots that were formed in the area and "K" is a maximum value of lower limit density values of pixels of the dither pattern corresponding to dots that were not formed in the area;

a fourth step that is performed if the patterns do not match each other in the second step, for dividing the area further into plural small areas and for determining whether or not a dot arrangement pattern of the image data in each small area matches the dither pattern;

a fifth step that is performed if the patterns match each other in the fourth step, for determining the representative value in the small area by the same process as the third step;

a sixth step that is performed if the patterns do not match each other in the fourth step, for encoding the dot arrangement in the small area; and a seventh step that is performed if the patterns match each other in the second step or the fourth step, for encoding in accordance with the determined representative value;

wherein the steps are performed by a computer.

24. The method according to claim 23, wherein a value having a minimum differential of the representative value between neighboring areas is used as the representative value.

25. The method according to claim 23, wherein a differential of the representative value between each area and another area is determined, and the determined differential is encoded in the seventh step.

26. A device for compressing image data that are processed by a pseudo gradation process using a dither pattern, the device comprising:

a portion for dividing the image data into predetermined areas;

a portion for determining whether or not a dot arrangement pattern of the image data in each area matches a dot arrangement pattern that is obtained by a binarization process that uses imaginary uniform image data and the dither pattern;

a portion for determining a representative value concerning density of the image data in the area if the dot arrangement pattern of the area matches the dot arrangement pattern for the imaginary uniform image data; and a portion for generating compressed data by using the determined representative value, wherein the representative value is any value "a" which satisfies the condition J≧a≧K, wherein a dot for a given pixel is formed if a density value of the given pixel is smaller than a density value of a pixel in a corresponding part of the dither pattern, "J" is a minimum value of upper limit density values of pixels of the dither pattern corresponding to the dots that were formed in the area and "K" is a maximum value of lower limit density values of pixels of the dither pattern corresponding to dots that were not formed in the area.

27. The device according to claim 26, wherein the portion for determining a representative value uses the representative value that is a value having a minimum differential of representative value between neighboring areas.

28. The device according to claim 26, wherein the portion for generating compressed data determines a differential of the representative value between each area and another area, and the portion encodes the determined differential.

29. A method for compressing image data that are processed by a pseudo gradation process using a dither pattern, the method comprising the steps of:

dividing the image data into predetermined areas;

determining whether or not a dot arrangement pattern of the image data in each area matches a dot arrangement pattern that is obtained by a binarization process that uses imaginary uniform image data and the dither pattern;

determining a representative value concerning density of the image data in the area if the dot arrangement pattern of the area matches the dot arrangement pattern for the imaginary uniform image data; and making compressed data by using the determined representative value;

wherein the representative value is a value "a" which satisfies the condition $J \geq a \geq K$, wherein a dot for a given pixel is formed if a density value of the given pixel is larger than a density value of a pixel in a corresponding part of the dither pattern, "J" is a minimum value of upper limit density values of pixels of the dither pattern corresponding to the dots that were formed in the area and "K" is a maximum value of lower limit density values of pixels of the dither pattern corresponding to dots that were not formed in the wherein the steps are performed by a computer.

* * * * *

UNITED STATES PATENT AND TRADEMARK OFFICE
CERTIFICATE OF CORRECTION

| | | |
|---|---|---|
| PATENT NO. | : 7,586,649 B2 | Page 1 of 1 |
| APPLICATION NO. | : 11/318046 | |
| DATED | : September 8, 2009 | |
| INVENTOR(S) | : Toshitsugu Yamamoto | |

It is certified that error appears in the above-identified patent and that said Letters Patent is hereby corrected as shown below:

Column 32:
Line 16 Claim 29, delete "in the wherein" and insert -- in the area; wherein --.

Signed and Sealed this

Third Day of November, 2009

David J. Kappos
*Director of the United States Patent and Trademark Office*

UNITED STATES PATENT AND TRADEMARK OFFICE
CERTIFICATE OF CORRECTION

| | | |
|---|---|---|
| PATENT NO. | : 7,586,649 B2 | Page 1 of 1 |
| APPLICATION NO. | : 11/318046 | |
| DATED | : September 8, 2009 | |
| INVENTOR(S) | : Toshitsugu Yamamoto | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 362 days.

Signed and Sealed this

Twenty-first Day of September, 2010

David J. Kappos
*Director of the United States Patent and Trademark Office*